United States Patent
Yoshiura et al.

[11] Patent Number: 6,100,992
[45] Date of Patent: Aug. 8, 2000

[54] IMAGE-FORMING SYSTEM

[75] Inventors: Syoichiro Yoshiura, Tenri; Yasuhiro Nakai, Soraku-gun; Hidetomo Nishiyama, Yamatokoriyama, all of Japan

[73] Assignee: Sharp Kabushiki Kaisha, Osaka, Japan

[21] Appl. No.: 08/769,429

[22] Filed: Dec. 19, 1996

[30] Foreign Application Priority Data

Dec. 27, 1995 [JP] Japan ................................ 7-341887

[51] Int. Cl.⁷ .................................................. G03G 15/00
[52] U.S. Cl. ........................ 358/1.14; 712/10; 382/304; 345/505; 345/510
[58] Field of Search ........................ 395/800.1, 114; 382/304; 345/505, 510; 712/10

[56] References Cited

U.S. PATENT DOCUMENTS

| | | | |
|---|---|---|---|
| 4,167,322 | 9/1979 | Yano et al. | 355/3 R |
| 4,797,706 | 1/1989 | Sugishima et al. | 355/14 |
| 5,287,194 | 2/1994 | Lobiondo | 358/296 |
| 5,511,150 | 4/1996 | Beaudet et al. | 395/113 |
| 5,564,109 | 10/1996 | Snyder et al. | |
| 5,574,831 | 11/1996 | Grenda | 395/104 |
| 5,689,755 | 11/1997 | Ataka | 399/8 |
| 5,689,765 | 11/1997 | Nishinozono | 399/81 |

FOREIGN PATENT DOCUMENTS

| | | |
|---|---|---|
| 679014 | 10/1995 | European Pat. Off. . |
| 195 18 321 | 12/1995 | Germany . |
| 53-116834 | 10/1978 | Japan . |
| 7-311839 | 11/1995 | Japan .................................... 395/114 |
| 2 288 508 | 10/1995 | United Kingdom . |

*Primary Examiner*—Mark R. Powell
*Assistant Examiner*—Lance W. Sealey
*Attorney, Agent, or Firm*—David G. Conlin; George W. Neuner

[57] ABSTRACT

An image-forming system is constituted by connecting a plurality of digital copying machines to a communication apparatus so that the digital copying machines can transmit and receive image information with each other. As an instruction for image processing is inputted at any of the digital copying machines, a control section of the digital copying machine outputs the image information to a digital copying machine that is capable of carrying out the image processing. The digital copying machine that is assigned the image processing carries out a predetermined image processing on the image information and returns the processed image information via the communication apparatus. The image information is then visualized by a digital copying machine that receives the image information. Therefore, even if a predetermined image-processing function cannot be found in the digital copying machine that is to be used, the image information is processed by another digital copying machine having that image-processing function. This reduces economic burden on the user of the digital copying machine.

29 Claims, 21 Drawing Sheets

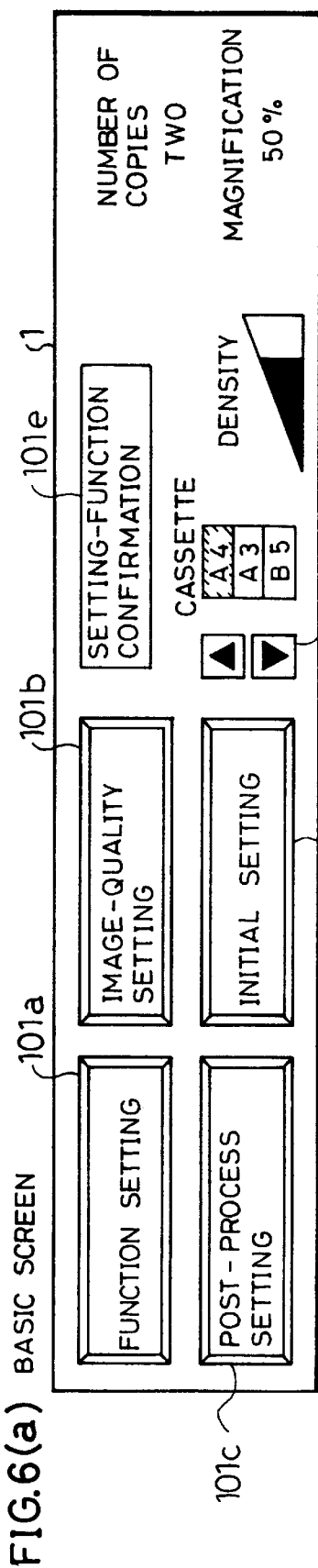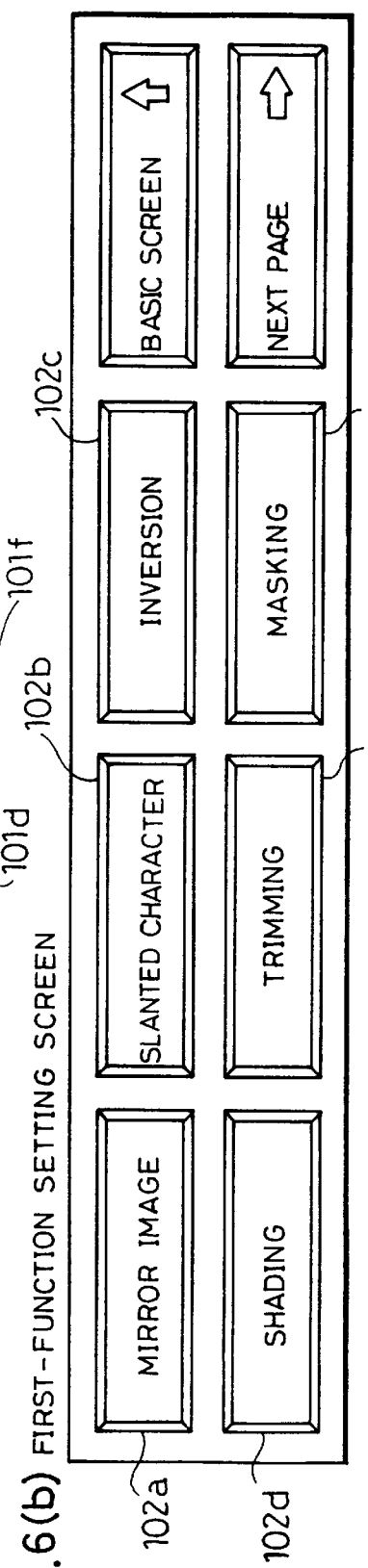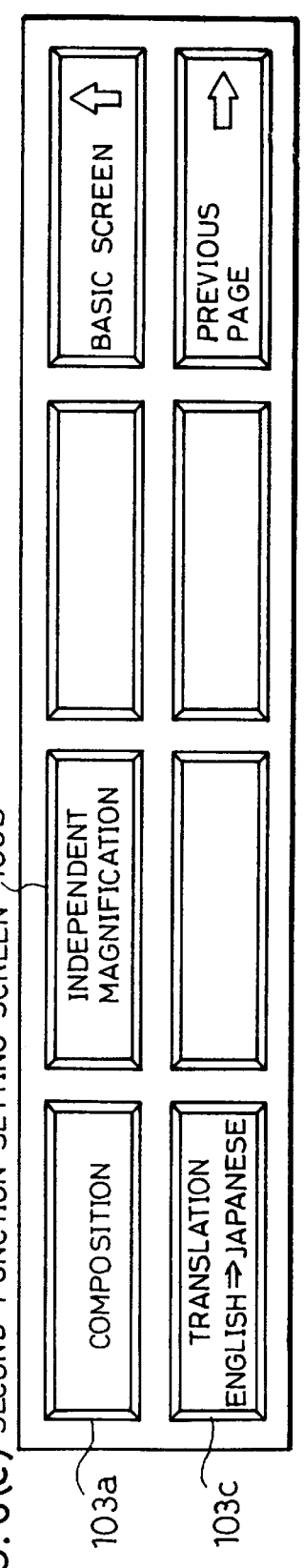

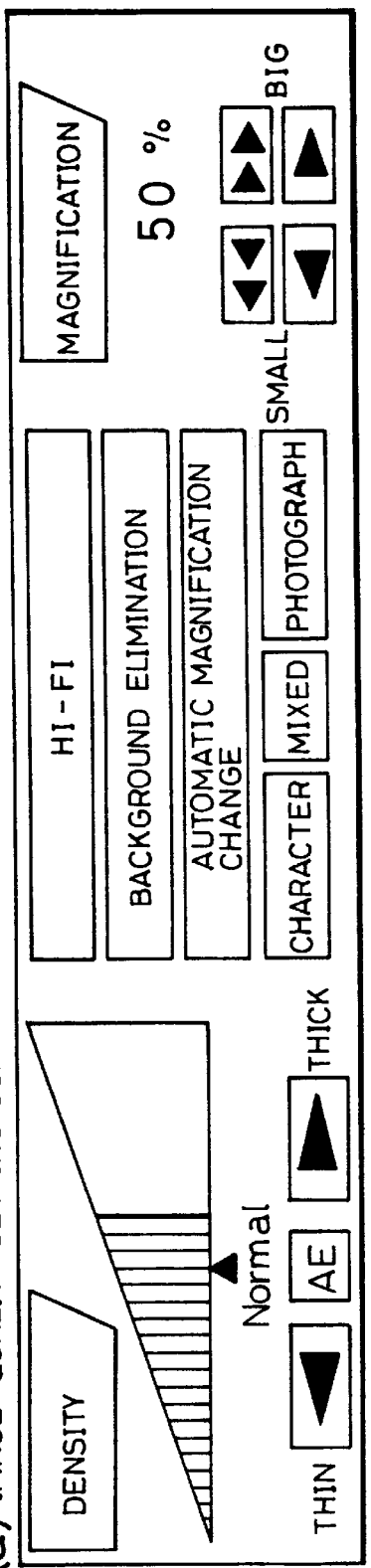
FIG.7(a) IMAGE-QUALITY SETTING SCREEN
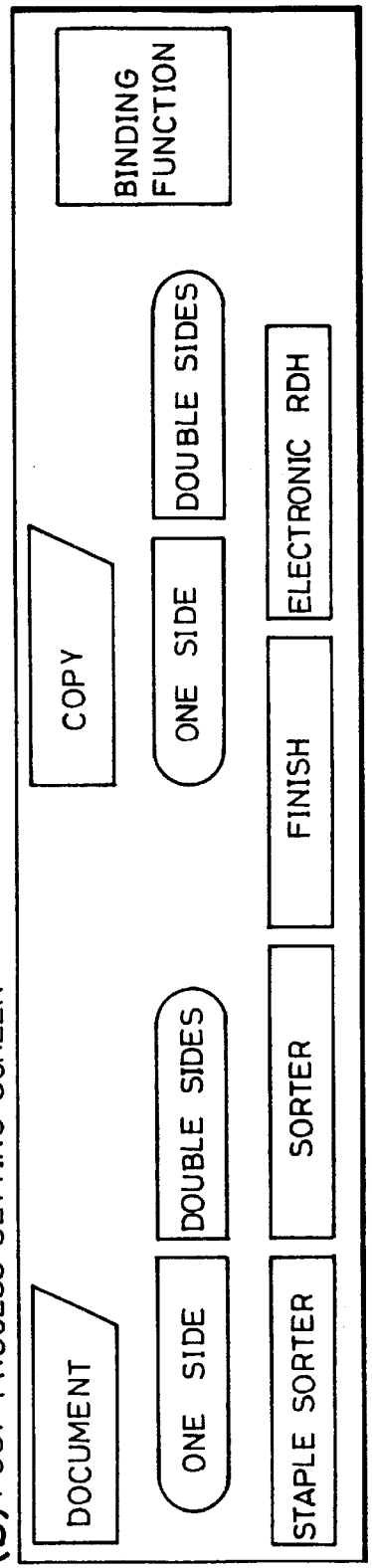
FIG.7(b) POST-PROCESS SETTING SCREEN

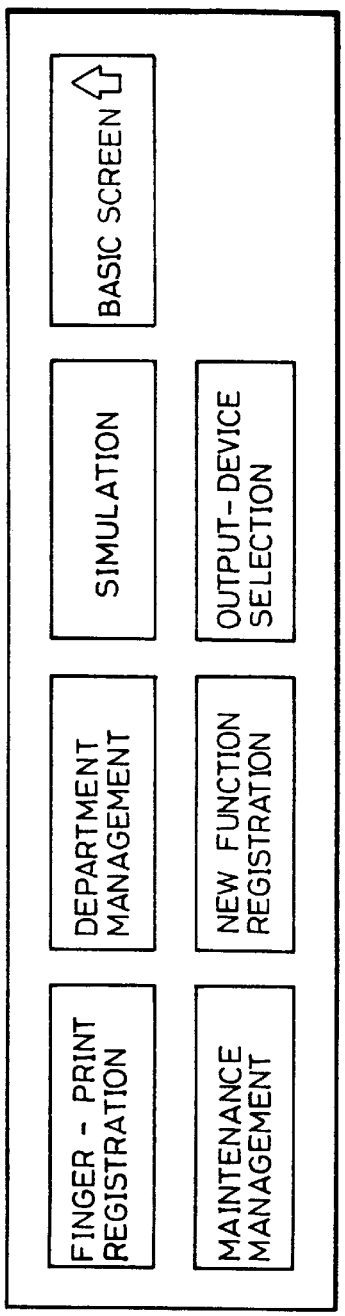
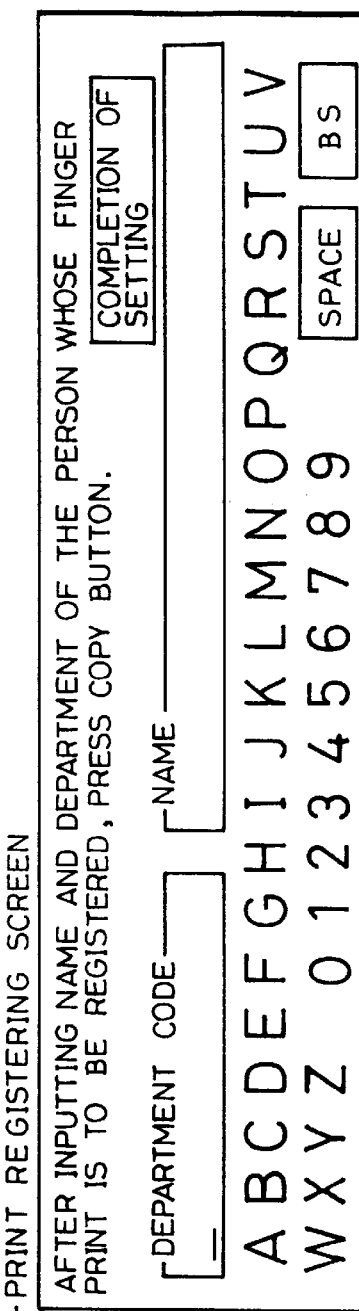
FIG.8(a) INITIAL SETTING SCREEN
FIG.8(b) FINGER-PRINT REGISTERING SCREEN
FIG.8(c) DEPARTMENT-MANAGEMENT SETTING SCREEN

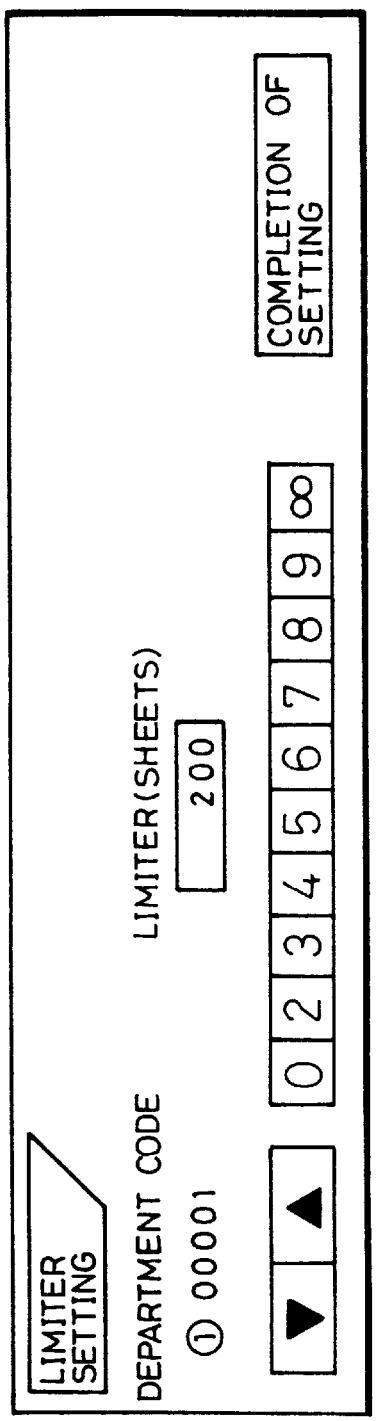
FIG. 9(a) LIMITER SETTING SCREEN
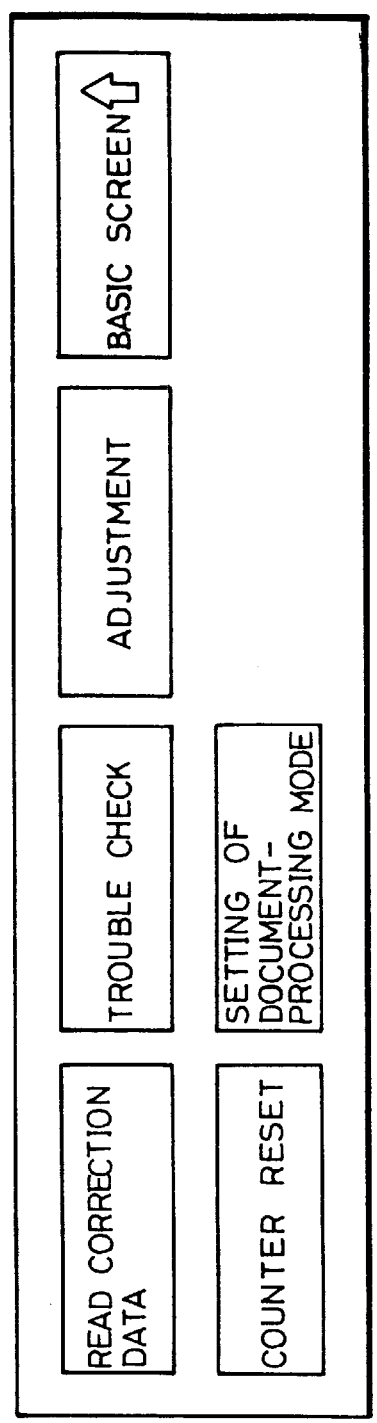
FIG. 9(b) SIMULATION SCREEN FIG. 16 (a)
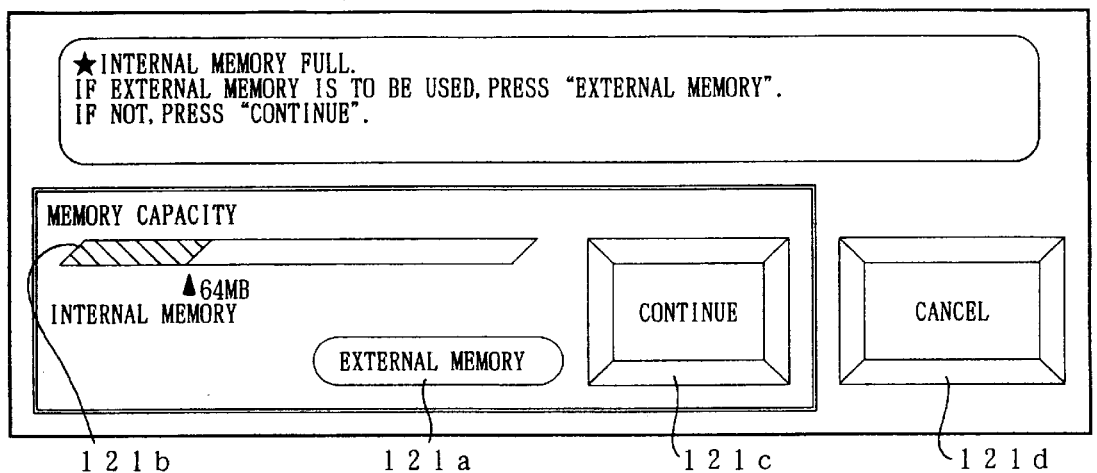
FIG. 16 (b) (EXTERNAL MEMORY SELECTION KEY PRESSED)
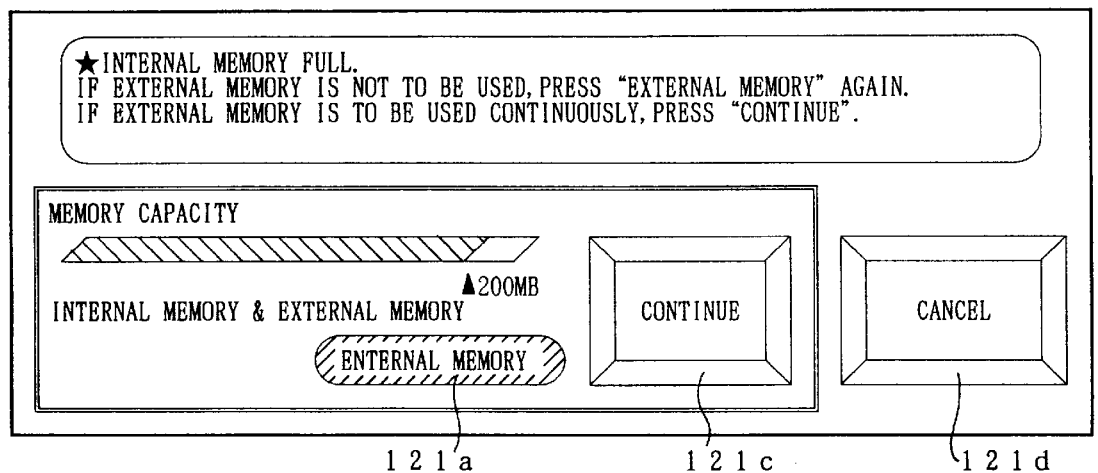
FIG. 16 (c) (CONTINUE KEY PRESSED)
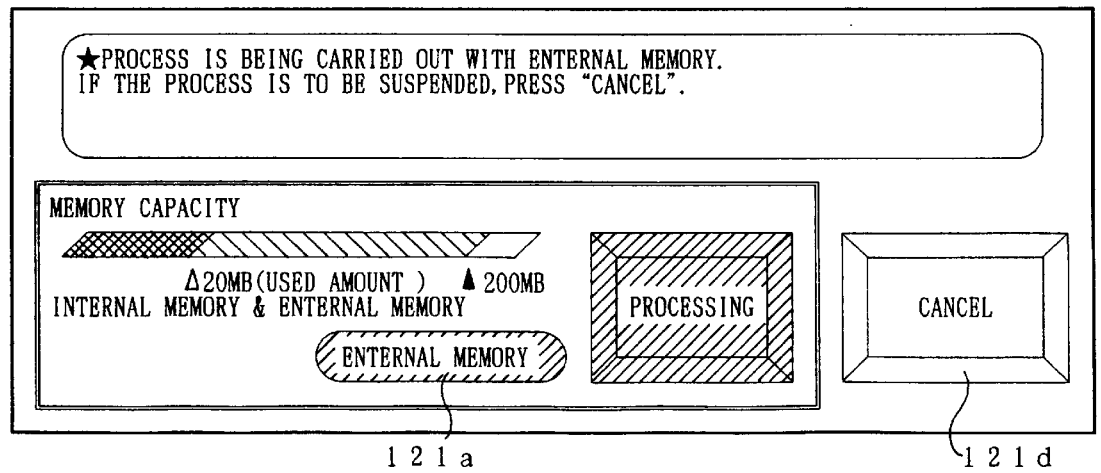

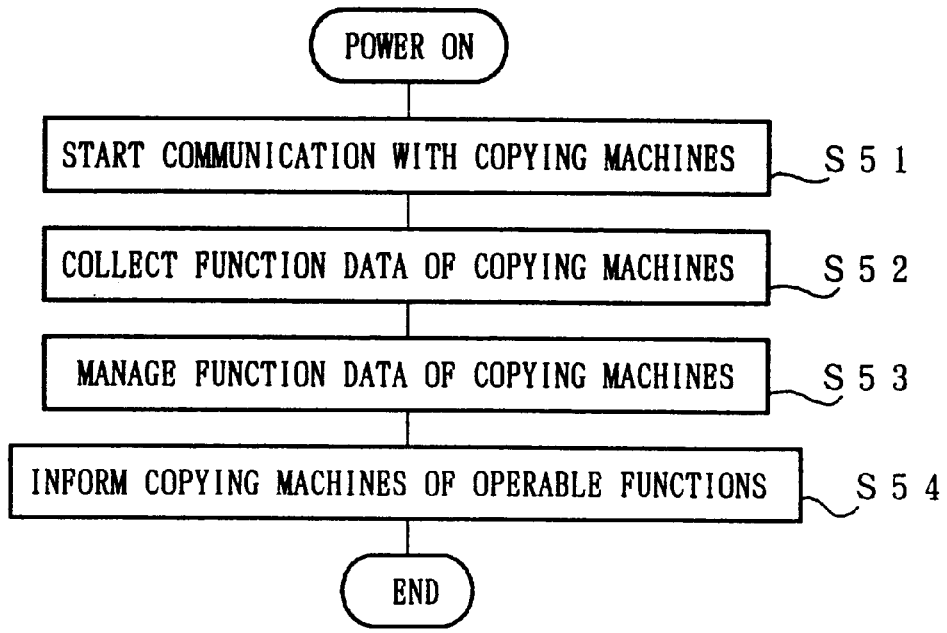
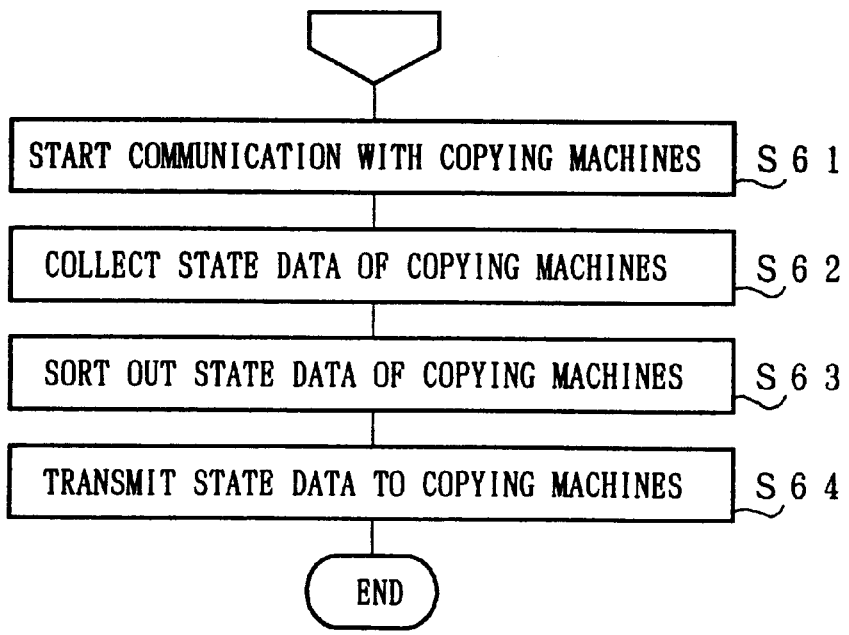

OPERATION STATES OF MACHINES

PPC A: STANDING BY

PPC B: PPC HAS ASSIGNED SLANTED CHARACTER PROCESS TO C

PPC C: PPC CARRYING OUT SLANTED CHARACTER PROCESS ASSIGNED BY B

PPC D: PPD COPYING

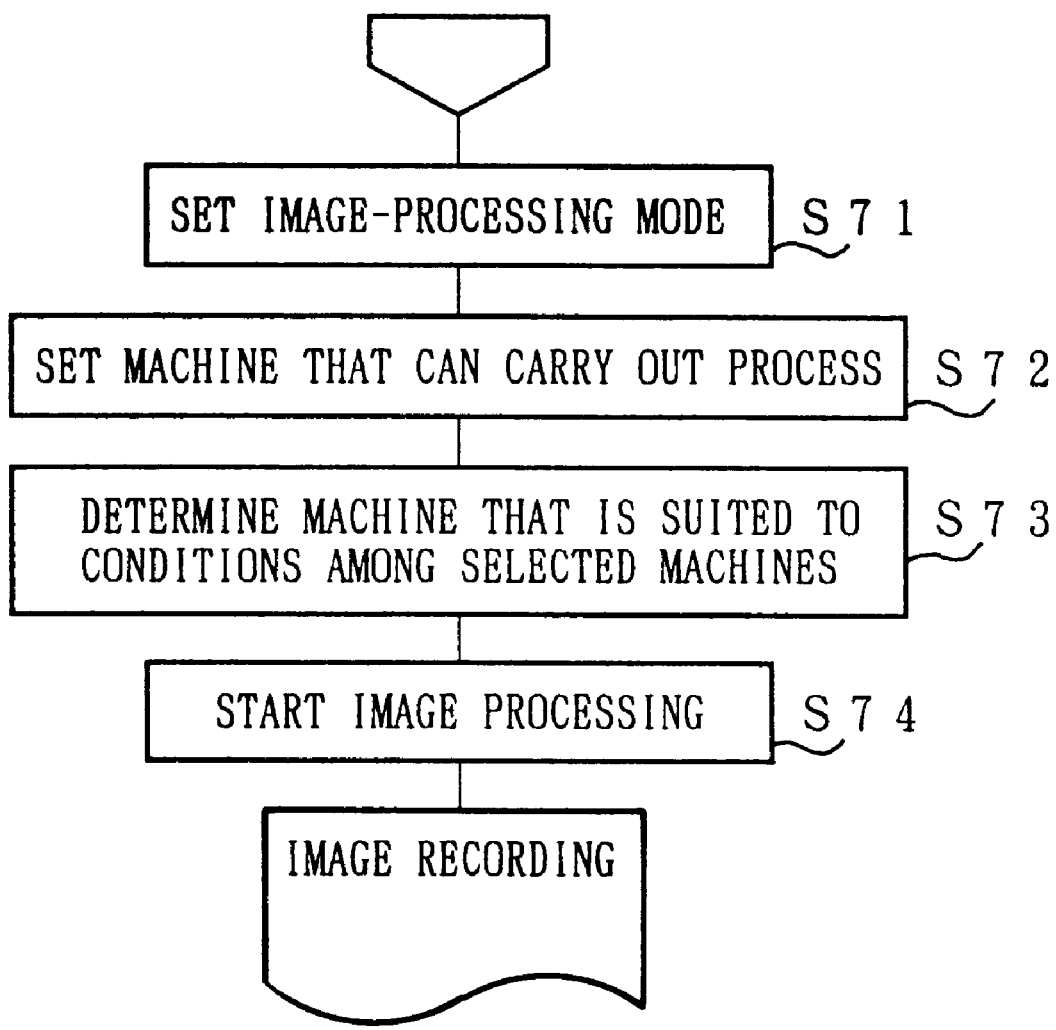

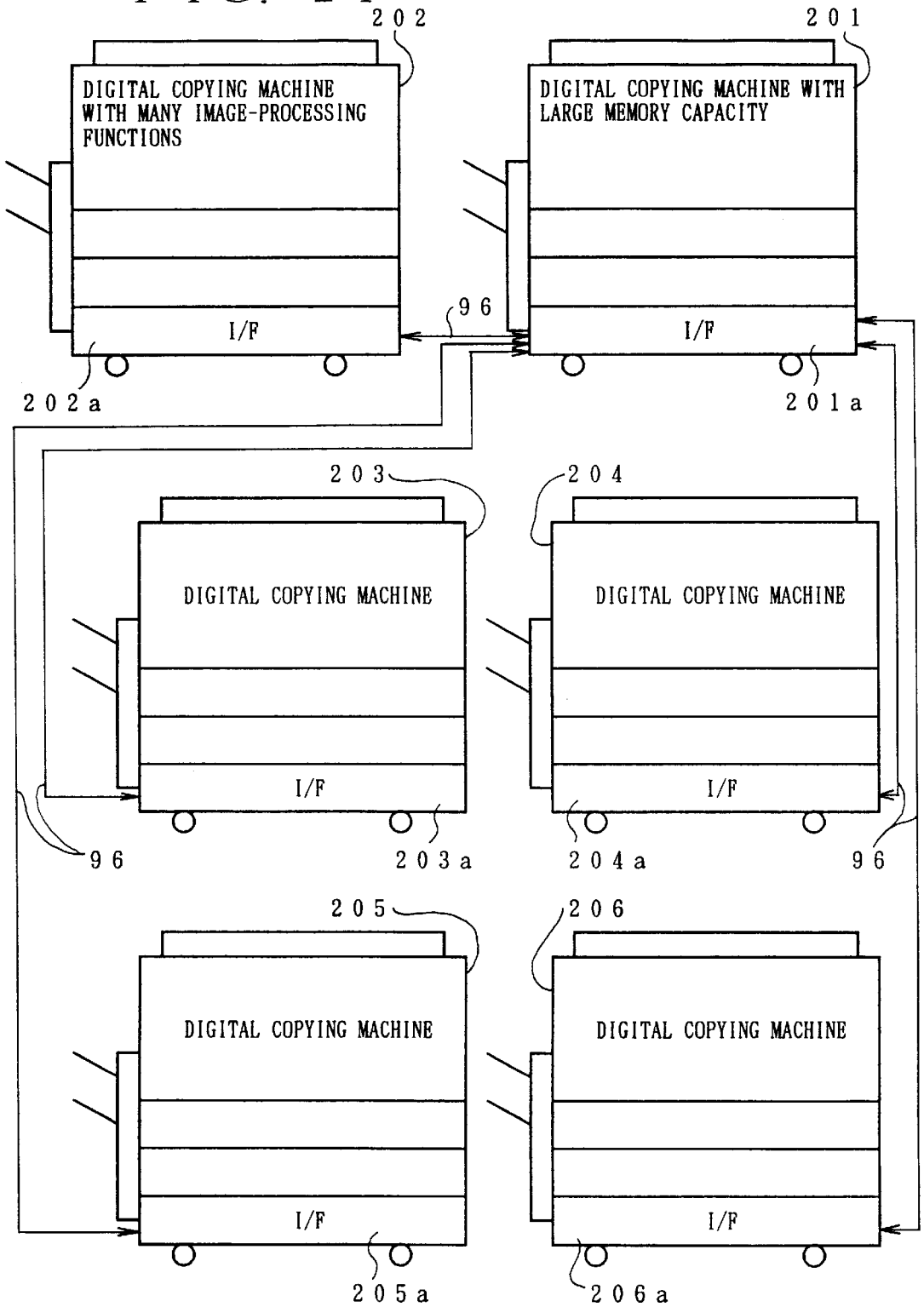

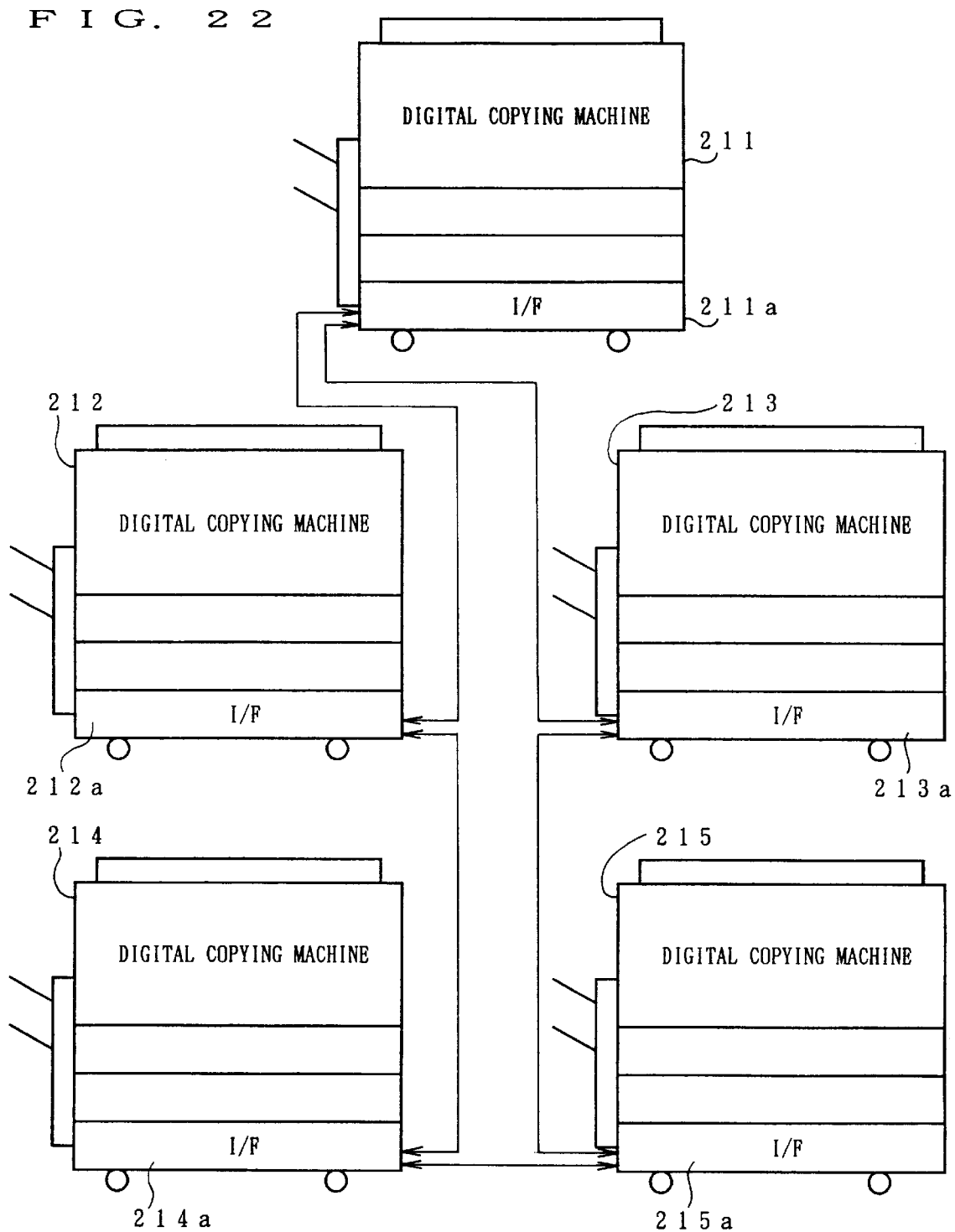

IMAGE-FORMING SYSTEM

FIELD OF THE INVENTION

The present invention relates to an image-forming system that has a plurality of image-processing apparatuses, such as digital copying machines, wherein the image-forming apparatuses are connected with each other through a communication apparatus.

BACKGROUND OF THE INVENTION

For example, when copying an original image, digital copying machines that are presently introduced into the market as image-forming apparatuses read the original image by using an image-reading section, subject the original image that has just been read to a specified image processing by using an image-processing section, and then print the image information by using a recording section. Therefore, in the digital copying machine of this type, an image is copied onto a sheet of paper by using only the image-processing functions that are provided in the digital copying machine.

Here, in recent years, it has been proposed that a plurality of image-recording apparatuses and/or other apparatuses be organized into a network. For example, Japanese Laid-Open Patent Publication 53-116834/1978 Tokukoushou 53-116834) discloses an arrangement wherein a plurality of image-reading apparatuses and a plurality of image-recording apparatuses are connected through a control section. In such an arrangement, an original image that has been read by any of the image-reading apparatuses is printed by any of the image-recording apparatuses. This arrangement makes it possible to shorten the stand-by time of the image-reading apparatus that is caused by processes, such as an exchanging process of originals in the image-reading apparatuses.

Moreover, Japanese Laid-Open Patent Publication 61-198958/1986 (Tokukoushou 61-198958) discloses an image-forming system wherein a plurality of copying machines, each having an image-reading section and an image-recording section, are connected to a control device. In this image-forming system, according to an original document copying mode that has been set, an image signal that is to be recorded is supplied to the plurality of copying machines in a distributed manner, and copying operations are carried out by the copying machines in parallel with one another.

However, the conventional image-forming systems have the following problems.

For example, various image-processing functions in the digital copying machine are dependent upon software. Here, with the recent remarkable developments of the software, the image-processing functions have been highly improved in a very short period, and new copying machines having additional unprecedented functions have been newly introduced into the market. Consequently, for example, even when a digital copying machine having desired image-processing functions is purchased, the digital copying machine, which has the highest image-processing functions at the time of the purchase, will soon become out-dated with relatively low functions in a short period.

In this case, it is impossible for the purchased digital copying machine to obtain functions higher than those originally provided in the digital copying machine. In the case when higher functions or newer functions are required, it is inevitable that a new copying machine to replace the older one has to be purchased. This tends to impose a big burden on users on an economic basis, and also to present an inherent problem for makers that try to provide consumers with new merchandise.

SUMMARY OF THE INVENTION

An object of the present invention is to offer an image-forming system that can reduce economic burden on the user of a digital copying machine.

In order to accomplish the object, the image-forming system of the present invention includes:

a first image-forming apparatus;

a second image-forming apparatus; and a communication apparatus for connecting the first and second image-forming apparatuses for transmitting and receiving image information with each other, wherein each of the first and second image-forming apparatuses has:

an image-recording section for forming a visual image in accordance with the image information; and an input section for inputting an instruction about processing at the image-forming apparatus, the second image-forming apparatus having a control section capable of outputting the image information to the first image-forming apparatus in accordance with the instruction for predetermined processing on the image information through the input section, the first image-forming apparatus having: a processing section for carrying out the predetermined processing on the image information; and a control section for supplying to the processing section the image information inputted via the communication apparatus and for outputting the image information processed here via the communication apparatus to the second image-forming apparatus.

With the arrangement, in the second image-forming apparatus, the image information is obtained by, for example, reading a document image with a scanner provided to the second image-forming apparatus. In the second image-forming apparatus, as an instruction for the predetermined processing on the image information is inputted through the input section with operation of the input section by the user, the control section outputs the image information via the communication apparatus to the first image-forming apparatus either in response to the input operation through the input section by the user or regardless of whether or not the input section has been operated.

In the first image-forming apparatus that has been assigned the processing, the predetermined professing is carried out on the image information in the processing section. The processed image information is transmitted via the communication apparatus to the second image-forming apparatus by the control section of the first image-forming apparatus. Therefore, in the second image-forming apparatus, that has received the processed image information, the image information is made into a visual image by the image-recording section.

As described above, in the present image-forming system, even if, for example, an image-processing function desired by the user cannot be found with the second image-forming apparatus that the user intends to use, the image processing can be carried out by the first image-forming apparatus connected to the second image-forming apparatus via the communication apparatus. Therefore, in the image-forming system, only the first image-forming apparatus needs to have the predetermined, for example, image-processing function, and the other image-forming apparatuses including the second image-forming apparatus are not necessarily provided with the image-forming function individually. This decreases economic burden on the user of the image-forming apparatuses.

For a fuller understanding of the nature and advantages of the invention, reference should be made to the ensuing detailed description taken in conjunction with the accompanying drawings.

BRIEF DESCRIPTION OF THE DRAWINGS

FIG. 6(a) is an explanatory view that shows a basic screen of a liquid crystal display on the operation panel; FIG. 6(b) is an explanatory view that shows a first-function setting screen of the liquid crystal display thereon; and FIG. 6(c) is an explanatory view that shows a second-function setting screen of the liquid crystal display thereon.

FIG. 7(a) is an explanatory view that shows a picture-quality setting screen of the liquid crystal display on the operation panel; and FIG. 7(b) is an explanatory view that shows a postprocess-setting screen of the liquid crystal display thereon.

FIG. 8(a) is an explanatory view that shows an initial setting screen of the liquid crystal display on the operation panel; FIG. 8(b) is an explanatory view that shows a fingerprint registering screen of the liquid crystal display thereon; and FIG. 8(c) is an explanatory view that shows a section-management setting screen of the liquid crystal display thereon.

FIG. 9(a) is an explanatory view that shows a limiter setting screen of the liquid crystal display on the operation panel; and FIG. 9(b) is an explanatory view that shows a simulation screen of the liquid crystal display thereon.

FIG. 16(a) is an explanatory drawing that shows a display state on the liquid crystal display when the memory of the digital copying machine has become full in the operation shown in FIG. 15; FIG. 16(b) is an explanatory view that shows a display state on the liquid crystal display when the external-memory selection key, shown in FIG. 16(a), is turned ON; and FIG. 16(c) is an explanatory view that shows a display state on the liquid crystal display when the continuation key, shown in FIG. 22(b), is turned ON.

FIG. 17 is a flow chart that shows managing operations for image-processing functions of respective digital copying machines by a host digital copying machine in the image-forming system shown in FIG. 11.

FIG. 18 is a flow chart that shows managing operations for operation states of the respective digital copying machines by the host digital copying machine in the image-forming system shown in FIG. 11.

FIG. 20 is a flow chart that shows an assigning operation of the image processing to another digital copying machine by the host digital copying machine in the image-forming system shown in FIG. 11.

FIG. 21 is a block diagram that shows a schematic construction of the image-forming system in accordance with another embodiment of the present invention.

FIG. 22 is a block diagram that shows a schematic construction of the image-forming system in accordance with still another embodiment of the present invention.

DESCRIPTION OF THE EMBODIMENT

Referring to FIGS. 1 through 20, the following description will discuss one embodiment of the present invention.

Figure 2:
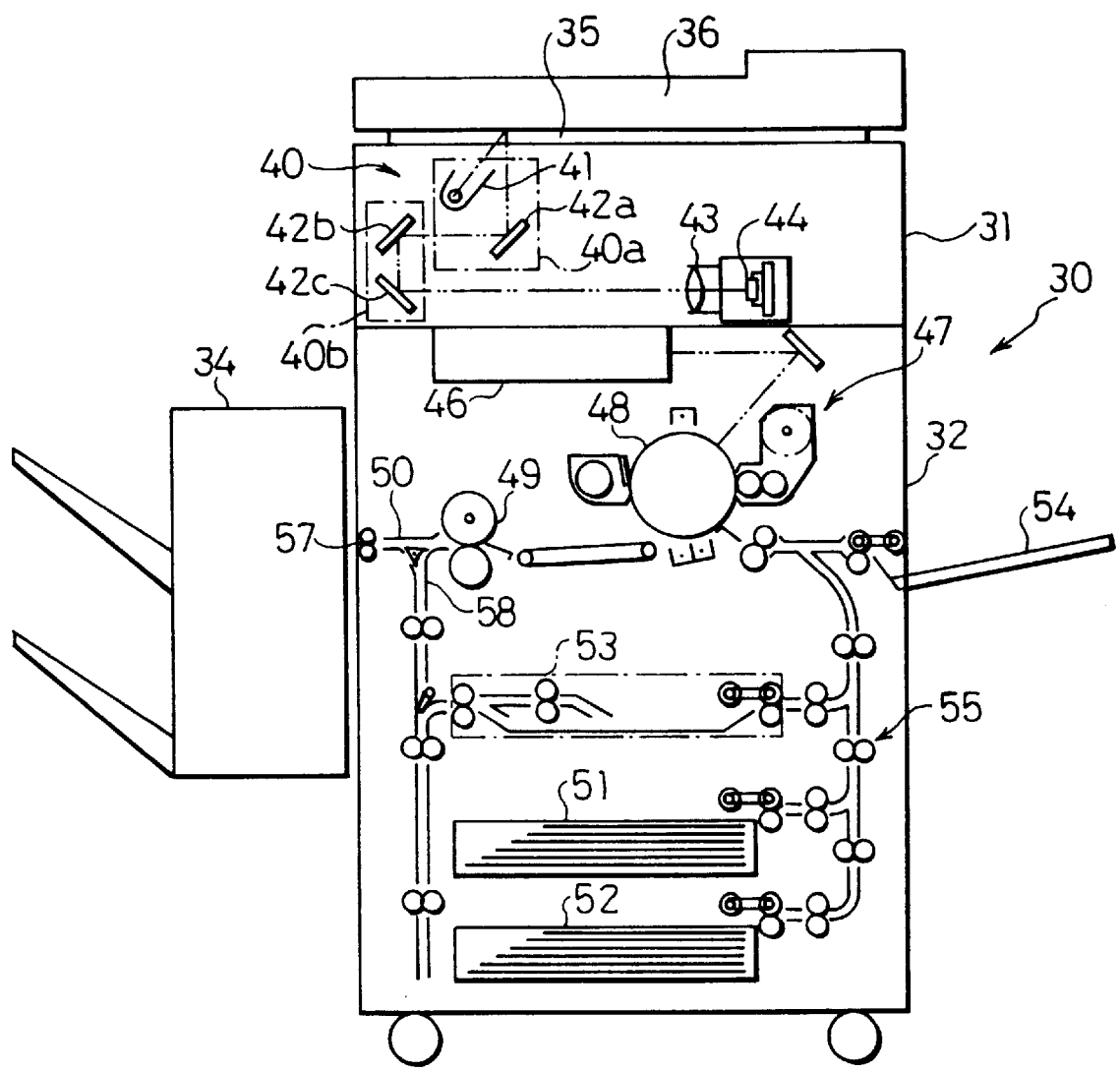
FIG. 2 is a longitudinal sectional view of a digital copying machine that is provided in the image-forming system.

The present image-forming system includes a plurality of digital copying machines as image-forming apparatuses connected through a communication apparatus. FIG. 2 is a cross-sectional view showing the entire structure of a digital copying machine 30 which is one example of the above-mentioned digital copying machine. In FIG. 2, the digital copying machine 30 is provided with a scanner section 31, a laser printer section 32 that functions as an image-recording section, and a post-processing device 34 that includes a sorter.

The scanner section 31 is provided with a document platen 35 made of transparent glass, a recirculating automatic document feeder 36 (hereinafter, referred to as RADF) for automatically supplying and feeding documents onto the document platen 35 and a scanner unit 40 that functions as a document image reading unit for scanning and reading an image of a document that has been placed on the document platen 35. The document image that has been read by the scanner unit 40 is sent as image information, that is, as image data, to an image-processing section, which will be described later, and predetermined image processing is carried out on the image data.

The RADF 36 is a device that automatically feeds a plurality of documents that have been set on a predetermined document tray all together one by one onto the document platen 35 of the scanner section 31. The RADF 36 is provided with a transport path for one-sided documents, transport paths for double-sided documents, a transport-path switching mechanism and other mechanisms so that one side or double sides of a document can be scanned by the scanner unit 40 in accordance with selection made by the user.

The scanner unit 40 is provided with a first scanning unit 40a, a second scanning unit 40b, an optical lens 43 and a CCD (Charge Coupled Device) 44. The first scanning unit 40 a is composed of a lamp reflector assembly 41 that irradiates with light the surface of a document placed on the document platen 35 so as to scan it, and a second reflection mirror 42a. The second scanning unit 40b is composed of second and third reflection mirrors 42b and 42c. The first to third reflection mirrors 42a to 42c direct reflected light from the document to the CCD 44. The optical lens 43 converges the image of reflected light from the document onto the CCD 44 as an image thereon. The CCD 44 is an element that converts an image of reflected light from the document into an electric image signal.

While successively placing documents onto the document platen 35, the scanner section 31 allows the scanner unit 40 to move along the lower surface of the document platen 35 and reads the document image so as to convert it into image data, through cooperative operations between the RADF 36 and the scanner unit 40. The image data, thus obtained from the scanner section 31, is sent to an image-processing section which will be described later, and after it has been subjected to various processes, the resulting data is temporarily stored in a memory 73 of the image-processing section. Thereafter, the image data is supplied to the laser printer section 32 in accordance with an instruction for output, and recorded onto a sheet of paper as an image.

The laser printer section 32 is provided thereon with a laser-writing unit 46, and an electrophotographic process section 47 for forming images, and is provided thereunder with a paper store and transport section 55. The laser-writing unit 46 has a semiconductor laser for releasing a laser light beam in response to the image data from the memory 73, a polygon mirror for deflecting the laser light beam with a constant angular velocity, an f-θ lens for correcting the laser light beam that has been subjected to the deflection with a constant angular velocity so that it is subjected to a constant-velocity deflection on the photoconductor drum 48 in the electrophotographic process section 47, and other parts.

In the same manner as conventional arrangements, the electrophotographic process section 47 is provided with the photoconductor drum 48, and devices, such as a charger, a developing device, a transfer device, a separating device, a cleaning device and a fixing device 49, all of which are disposed around the photoconductor drum 48. A transport path 50 is placed on the downstream side of the fixing device 49 in a transporting direction of a sheet of paper on which an image has been formed. The transport path 50 is separated into a transport path 57 that connects to the post-processing device 34 and a transport path 58 that connects to the sheet of paper store and transport section 55.

The paper store and transport section 55 has a first cassette 51, a second cassette 52, a double-side copying unit 53 and a multilayered manual tray 54. Stacks of paper are housed in the first and second cassettes 51 and 52. When the user selects a cassette that contains paper of a desired size, sheets of paper are fed one by one from the stack of paper in the cassette, and successively transported toward the electrophotographic process section 47. The double-side copying unit 53 is either for reversing the front and back sides of a sheet of paper on which the image is formed by the electrophotographic process section 47 and then feeding the sheet of paper again to the electrophotographic process section 47, or for feeding the sheet of paper again to the electrophotographic process section 47 without reversing it.

In the laser printer section 32, the image data, which has been read from the memory 73, is released as a laser light beam from the laser writing unit 46, and formed as an electrostatic latent image on the surface of the photoconductor drum 48 in the electrophotographic process section 47. The electrostatic latent image is visualized as a toner image, and the toner image is electrostatically transferred onto a sheet of paper that has been transported from the paper store and transport section 55, and then is fixed on the sheet of paper by the fixing device 49. The sheet of paper on which the image has been formed in this manner is sent from the fixing device 49 to the post-processing device 34 through the transport path 50, or again to the electrophotographic process section 47 through the transport paths 50 and 58 and the double-side copying unit 53.

Figure 3:
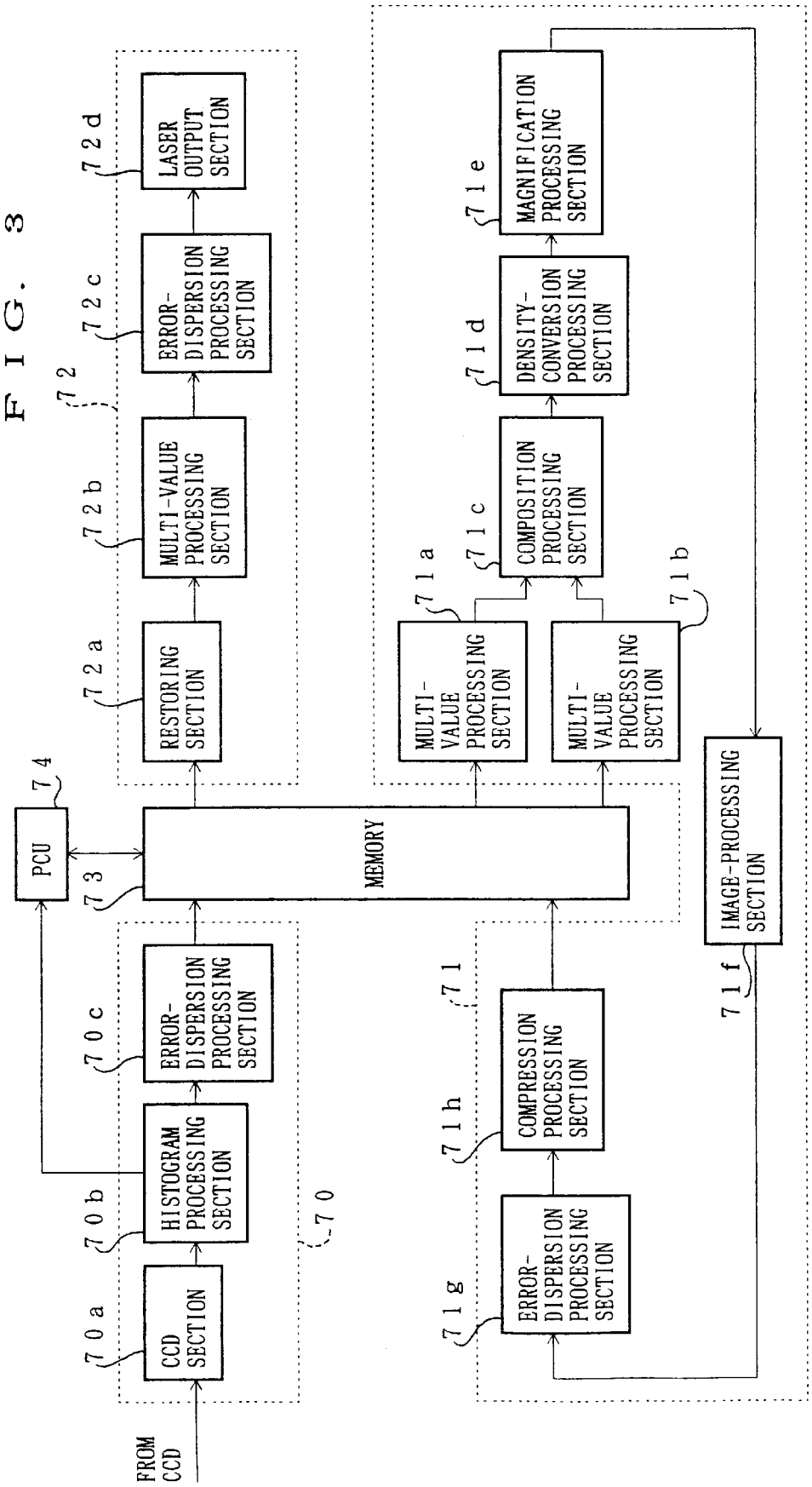
FIG. 3 is a block diagram that shows an image-processing section that is installed in the digital copying machine.

The following description will discuss the image-processing section that is installed in the digital copying machine 30. The image-processing section carries out image processing on the image data of the document that has been obtained from the scanner section 31. As illustrated in FIG. 3, the image-processing section is provided with an image-data input section 70, an image-data processing section 71, an image-data output section 72, a memory 73 that functions as an image information memory section and a print control unit 74 (hereinafter, referred to as PCU) that functions as a control section.

The PCU 74, which controls the entire operations of the digital copying machine 30, is constituted by a CPU (Central Processing Unit). The memory 73, which stores image data, is constituted by a RAM (Random Access Memory), a hard disk and other parts.

The image-data input section 70 has a CCD section 70a, a histogram processing section 70b and an error-dispersion processing section 70c. The image-data input section 70 converts image data of a document that has been read by the CCD 42 into binary coded data, and processes the image data by using the error-dispersion method while representing the data as binary digital quantity in the histogram, thereby temporarily storing the resulting data in the memory 73.

In the CCD section 70a, analog signals, which correspond to respective pixel densities of the image data, are analog-to-digital converted, and then subjected to an MTF correction and a black-and-white correction, or a gamma correction, and the resulting signals are released to the histogram processing section 70b as digital signals with 256 gray scales (8 bit).

In the histogram processing section 70b, the digital signals released from the CCD section 70a are added individually for the respective pixel densities of 256 gray scales; thus, density information (histogram data) is obtained. The histogram data is sent to the error-dispersion processing section 70c as pixel data, and also sent to the PCU 74, if necessary.

In the error-dispersion processing section 70c, the digital signals of 8 bits/pixel, released from the CCD section 70a, are converted into one bit (binary coded) by the error-dispersion method which is one type of pseudo intermediate processing, that is, by the method for reflecting the error of binary coded digits to the binary coding decision between the adjacent pixels; thus, re-distributing operations for exactly reproducing the densities of local regions of a document are carried out.

The image-data processing section 71 is provided with multi-value processing sections 71a and 71b, a synthesis processing section 71c, a density-conversion processing section 71d, a magnification processing section 71e, an image-processing section 71f, an error-dispersion processing section 71g and a compression processing section 71h. The image-data processing section 71 serves as a processing section for converting the inputted image data into image date that is desired by the user. Various processes are carried out in this section until final output image data has been stored in the memory 73. Additionally, the above-mentioned processing sections, contained in the image-data processing section 71, are used on demand, and are not necessarily used.

In the multi-value processing sections 71a and 71b, the image data that has been binary coded in the error-dispersion processing section 70c is again converted into data with 256 gray scales. In the synthesis processing section 71c, logical operations, that is, OR, AND or exclusive-OR operation, are selectively carried out for each pixel. The data used in this operation is pixel data stored in the memory 73 and bit data from a pattern generator (PG).

In the density-conversion processing section 71d, the relationship of the output density to the input density is properly set with respect to the data with 256 gray scales based upon a predetermined gray-scale conversion table. In the magnification processing section 71e, pixel data (density value) on a target pixel that is to be obtained after a specified change in magnification is found by carrying out an interpolating process based on the inputted known data in accordance with a specified magnification. Thereafter, in accordance with the pixel data, the change in magnification is carried out in the sub-scanning direction, and then is carried out in the scanning direction.

In the image-processing section 71f, various kinds of image processing is carried out on the inputted pixel data. Moreover, information extraction with respect to data rows, such as feature extraction, is carried out. In the error-dispersion processing section 71g, the same process as that carried out in the error-dispersion processing section 70c in the image-data input section 70 is carried out. In the compression processing section 71h, the binary data is compressed by a coding process that is referred to as "run length". Here, with respect to the compression of image data, the compression is operated in the last processing loop at the time when the final output image data has been complete.

The image-data output section 72 is provided with a restoring section 72a, a multi-value processing section 72b, an error-dispersion processing section 72c and a laser output section 72d. The image-data output section 72 restores the image data that has been stored in the memory 73 in a compressed state so as to again convert it to the original data with 256 gray scales, carries out an error dispersion for quaternary data that provides smoother intermediate gray-scale expressions than binary data, and then transmits the resulting data to the laser output section 72d.

In the restoring section 72a, the image data that has been compressed by the compression processing section 71h is restored. The multi-value processing section 72b carries out the same process as that carried out in the multi-value processing sections 71a and 71b in the image-data processing section 71. The error-dispersion processing section 72c carries out the same process as that carried out in the error-dispersion processing section 70c in the image-data input section 70.

In the laser output section 72d, the digital pixel data is converted to a laser on/off signal in accordance with a control signal from a sequence controller which is not shown. The semiconductor laser in the laser-writing unit 46 is turned ON/OFF in response to the on/off signal, thereby allowing an electrostatic latent image to be written on the photoconductor drum 48.

Additionally, data, which is dealt in the image-data input section 70 and the image-data output section 72, is basically stored in the memory 73 in the form of binary data so as to save the capacity of the memory 73; however, the data may be processed in the form of quarternary data in order to prevent the degradation of image data.

Figure 4:
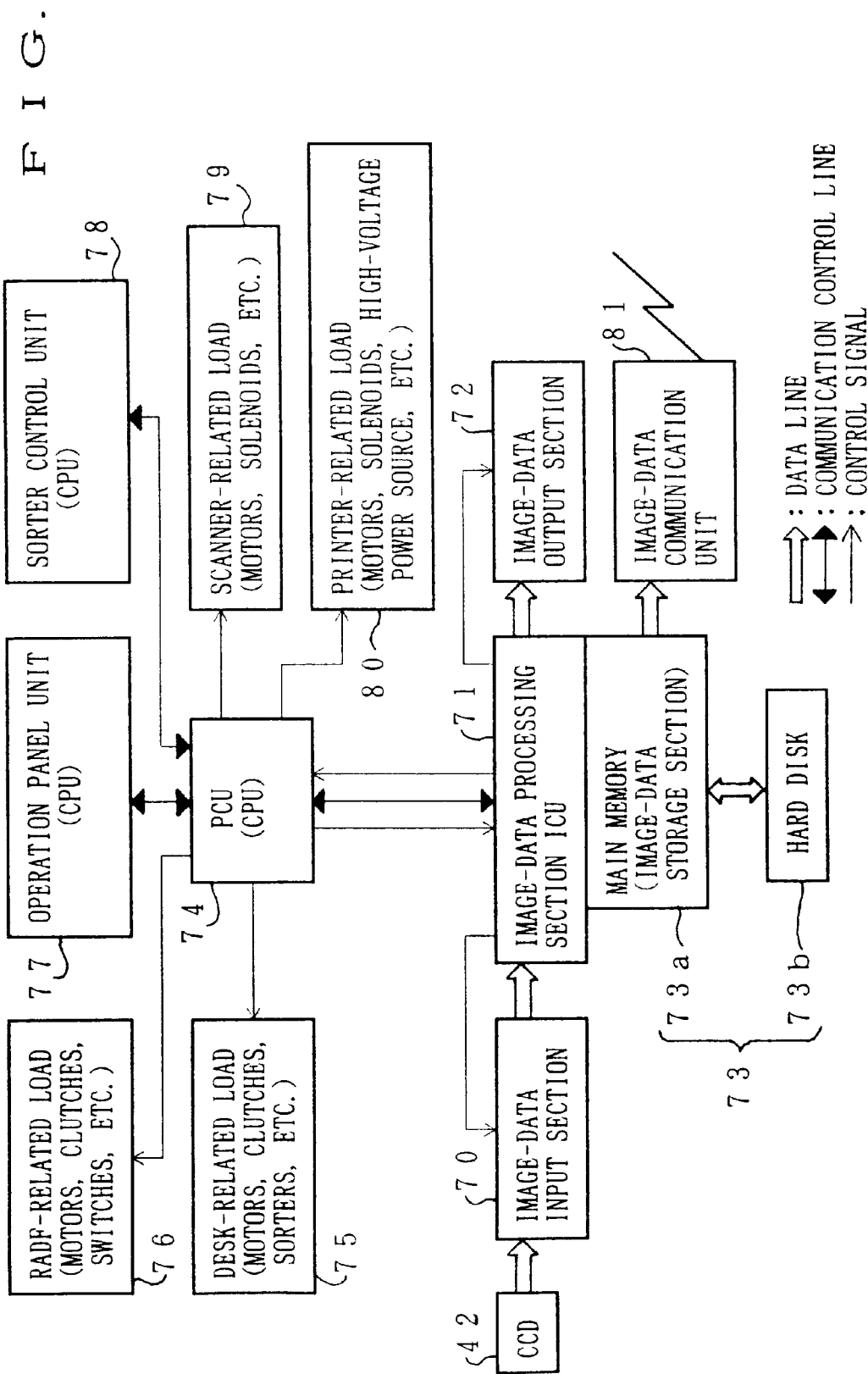
FIG. 4 is a block diagram that shows an arrangement of a control system that is installed in the digital copying machine.

The operation of the digital copying machine 30 is controlled by the PCU 74, and FIG. 4 shows the arrangement of the control system effected by the PCU 74.

In FIG. 4, the following parts and sections are connected to the PCU 74: a desk-related load 75, an RADF-related load 76, an operation panel unit 77, a sorter control unit 78, a scanner-related load 79, a printer-related load 80 and the aforementioned image-data processing section 71.

The PCU 74 supervises the above-mentioned parts by sequential control, and releases control signals to the respective parts upon controlling them. The desk-related load 75 is a load related to motors, clutches and other parts in the multi-stage paper-feed unit 33 and the sorter of the post-processing device 34 except for the digital copying machine main body. The RADF-related load 76 is a load related to motors, clutches, switches and other parts in the RADF 36. The scanner-related load 79 is a load related to motors, solenoids and other parts in the scanner unit 40. The printer-related load 80 is a load related to motors, solenoids, a high-voltage power source and other parts in the electro-photographic process section 47. The sorter control unit 78, which is provided with a CPU, controls the operation of the sorter in accordance with the control signal from the PCU 74.

The operation panel unit 77, which has a CPU, is an input section for various settings such as copying modes, instructions, etc. that are inputted by the user to the digital copying machine 30. The operation panel unit 77 transfers a control signal, for example, corresponding to a copying mode that has been set by the user through an input operation, to the PCU 74. The PCU 74 operates the digital copying machine 30 in accordance with the corresponding mode in response to the control signal. The PCU 74 also transfers to the operation panel unit 77 a control signal that indicates the operation state of the digital copying machine 30. In order to inform the user of the current operation state of the digital copying machine 30, the operation panel unit 77 displays the current state on its display section in accordance with the control signal.

Moreover, the memory 73, connected to the image-data processing section 71, is constituted by a main memory 73a and a hard disk 73b which are made of, for example, semiconductor memories. An image-data communication unit 81 is connected to the main memory 73a. The image-data communication unit 81 is installed so as to make possible information communications with other digital information apparatuses through image data, image-control signals, etc. For example, in a digital copying machine 93 shown in FIG. 11, the image-data communication unit 81 corresponds to an interface 93a and a communication line 96.

Figure 5:
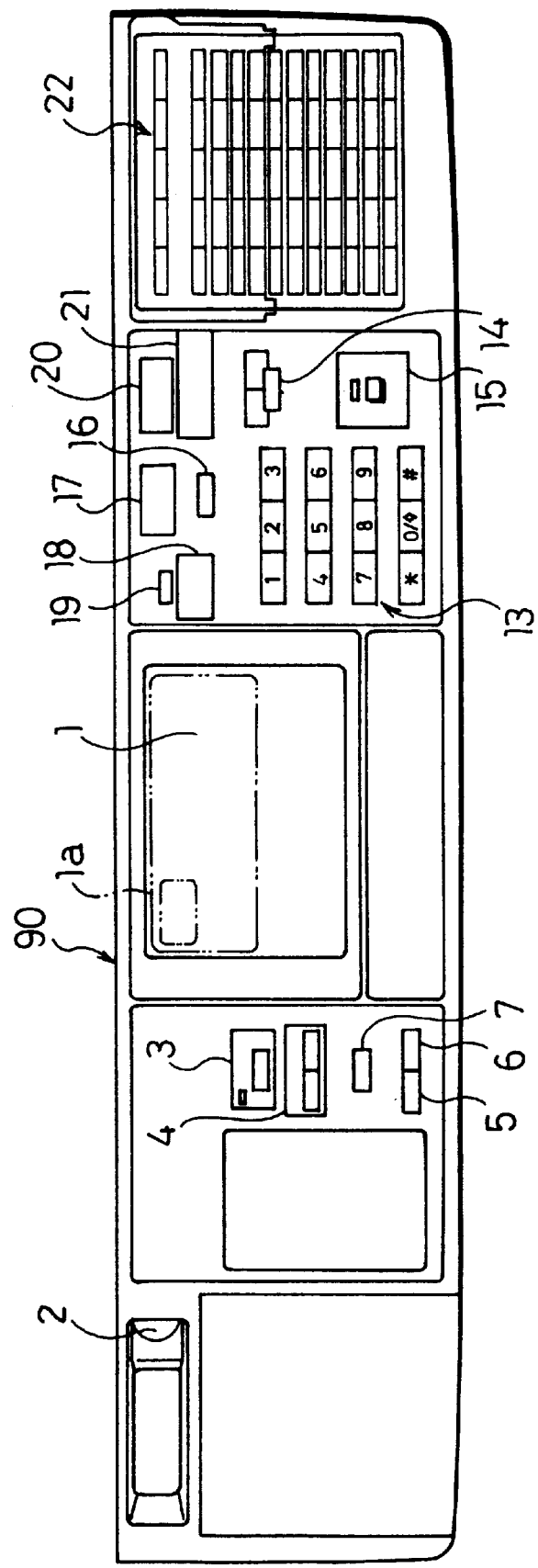
FIG. 5 is a front view of an operation panel that is attached to the digital copying machine.

The operation panel unit 77 is provided with an operation panel 90 which functions as an input section, as shown in FIG. 5. On the operation panel 90, a liquid crystal display 1, which is a display section of a touch panel system, is placed in the center thereof. A screen-switching instruction area 1a is disposed on one part of the screen of the liquid crystal display 1. The screen-switching instruction area 1a is used for inputting an instruction for switching the display screen of the liquid crystal display 1 to a screen for selecting image-editing functions. When the user directly presses this area 1a with his or her finger, various editing functions are displayed in a list on the screen of the liquid crystal display 1 so as to make it possible to select desired functions, as will be described later. In this case, when the user presses an area of a desired editing function among display areas of the various editing functions, the specified editing function is set.

Further, on the operation panel 90, a brightness adjusting dial 2, which adjusts the brightness of the screen of the liquid crystal display 1, is placed on its left-end position as shown in FIG. 5. A magnification automatic setting key 3, a zoom key 4, fixed magnification keys 5 and 6, and an equal magnification key 7 are provided between the dial 2 and the liquid crystal display 1. The magnification automatic setting key 3 is used for setting the mode for automatically selecting the copy magnification, and the zoom key 4 is used for setting the copy magnification at a rate of 1 percentage point. The fixed magnification keys 5 and 6 are used for selecting a fixed magnification, and the equal magnification key 7 is used for returning the copy magnification to the reference magnification (equal magnification).

On the right-hand position of the liquid crystal display 1 in FIG. 5, a number setting key 13, a clear key 14, a start key 15, an all cancellation key 16, an interruption key 17, an operation guide key 18, a message forwarding key 19, a memory-transmission mode key 20, a copy/facsimile mode switching key 21, and one-touch dial key 22 are disposed.

The number setting key 13 is used for setting the number of copies, and the clear key 14 is operated when the number of sheets is cleared, or when a continuous copying operation is stopped in the middle of the operation. The start key 15 is used for instructing the start of a copy process, and the all cancellation key 16 is used for cancelling all the presently set modes so as to return the machine to the reference state. The interruption key 17 is operated when upon a continuous copying process, another document is to be copied. The operation guide key 18 is operated when the user does not know how to use the digital copying machine 30, and upon pressing the key, the liquid crystal display 1 displays how to operate the digital copying machine 30. The message forwarding key 19 is used for switching the display of messages that have been displayed by the operation of the operation guide key 18 in a successive forwarding manner.

The memory-transmission mode key 20, the copy/facsimile mode switching key 21, and the one-touch dial key 22 are setting keys related to facsimile mode. The memory-transmission mode key 20 is used for instructing that the transmit document be transmitted after having been temporarily stored in the memory, and the copy/facsimile mode switching key 21 is used for switching modes of the digital copying machine 30 between the copy and facsimile. The one-touch dial key 22 is used for dialing the phone to a receiver whose telephone number has been preliminarily stored in the digital copying machine 30 by a one-touch operation.

Here, the above-mentioned arrangement of the operation panel 90 related to various kinds, layout, etc. of keys is merely given as one example, and it may be modified depending on various functions to be installed in the digital copying machine 30.

The liquid crystal display 1 is, for example, allowed to give the following displays on the screen: a basic screen as shown in FIG. 6(a), the first-function setting screen shown in FIG. 6(b), the second-function setting screen shown in FIG. 6(c), an image-quality setting screen shown in FIG. 7(a), a post-process setting screen as shown in FIG. 7(b), an initial setting screen shown in FIG. 8(a), a finger-print registration screen shown in FIG. 8(b), a department-management setting screen shown in FIG. 8(c), a limiter setting screen shown in FIG. 9(a), a simulation screen shown in FIG. 9(b), and other screens which will be described later.

The basic screen is provided with a function setting region, an image-quality setting region, a post-process setting region, an initial setting region, an operation region for set-function confirmation and a cassette-setting region. These regions correspond to setting keys 101a through 101f. Moreover, the basic screen includes a set-cassette display, a density display, a copy-number display and a magnification display. When the above-mentioned operation region for set-function confirmation is operated, functions that have been set in the present image-forming system are displayed on the liquid crystal display 1.

The first-function setting screen is provided with regions for setting various editing functions, such as mirror image, slanted character, inversion, shading, trimming and masking. These regions correspond to setting keys 102a through 102f. Moreover, operation regions are set so as to provide transitions to the basic screen and the next screen.

The second-function setting screen is provided with regions for setting editing functions, such as synthesis and an independent change in magnification, and translation functions. These regions correspond to setting keys 103a through 103c. Moreover, operation regions are set so as to provide transitions to the basic screen and the next screen.

The image-quality setting screen includes setting regions for setting the density, HI-FI (high-image-quality copying mode), background-elimination mode, automatic-magnification-change mode, character mode, character-photograph mixed mode, photograph mode and magnification. Furthermore, displays are provided for density and magnification.

The post-process setting screen is provided with an input region for determining whether a document in question is one-sided or double-sided, an input region for determining whether copying in question is made on one side or on double sides, and a setting region for binding functions. Moreover, setting regions for post-process functions, such as staple sorter, sorter and finish, and a setting region for electronic RDH are placed.

The initial setting screen is provided with setting regions for various modes, such as finger-print registration, department management, simulation, maintenance management, new function registration, and output-device selection, as well as an operation region for making a transition to the basic screen.

On the finger-print registration screen, input regions for a department code and a name are placed, and the inputted department code and name are displayed.

Figure 10:
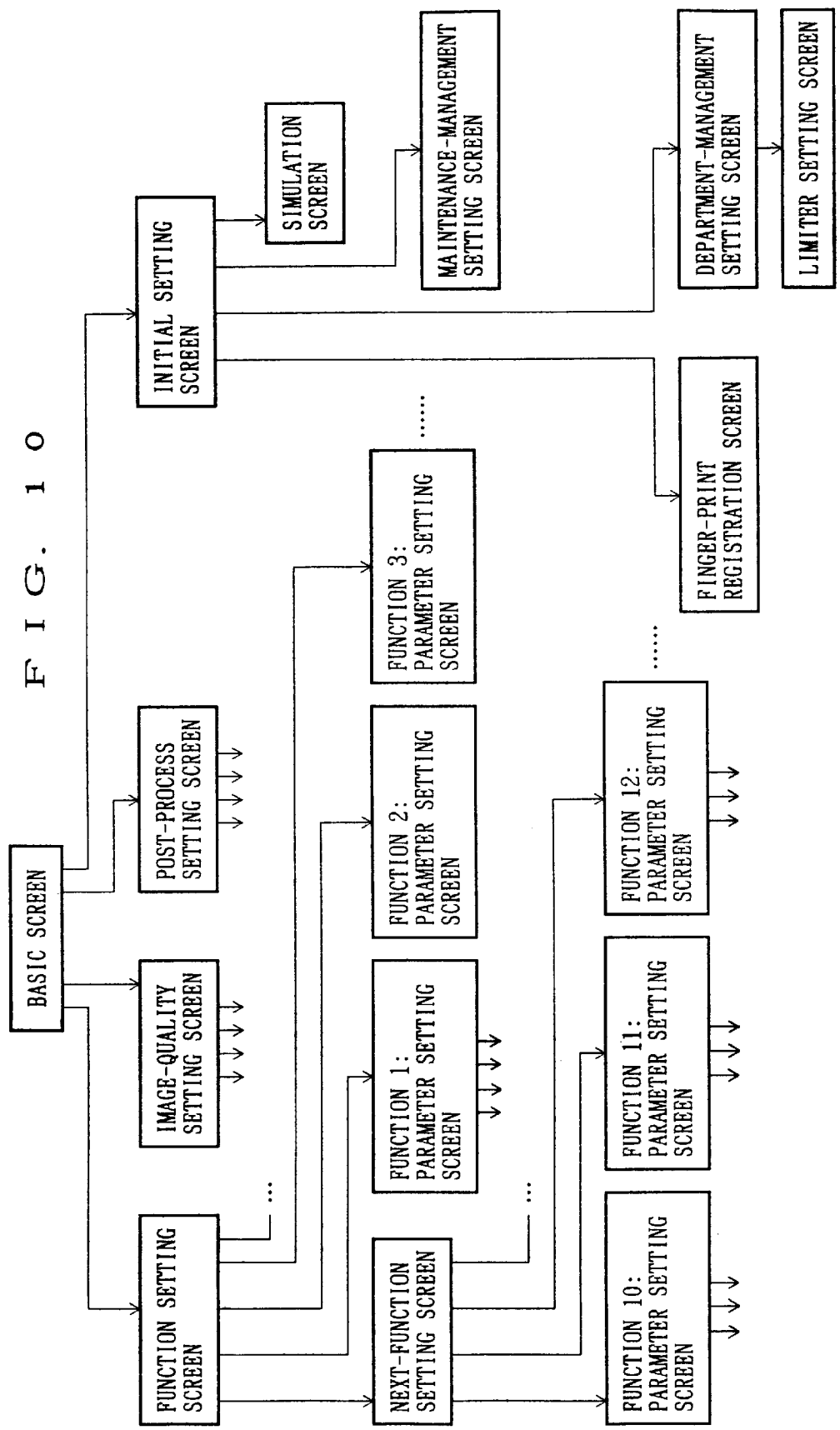
FIG. 10 is an explanatory view that shows processes in which the respective screens transfer to other screens in the liquid crystal display on the operation panel.
Figure 12A:
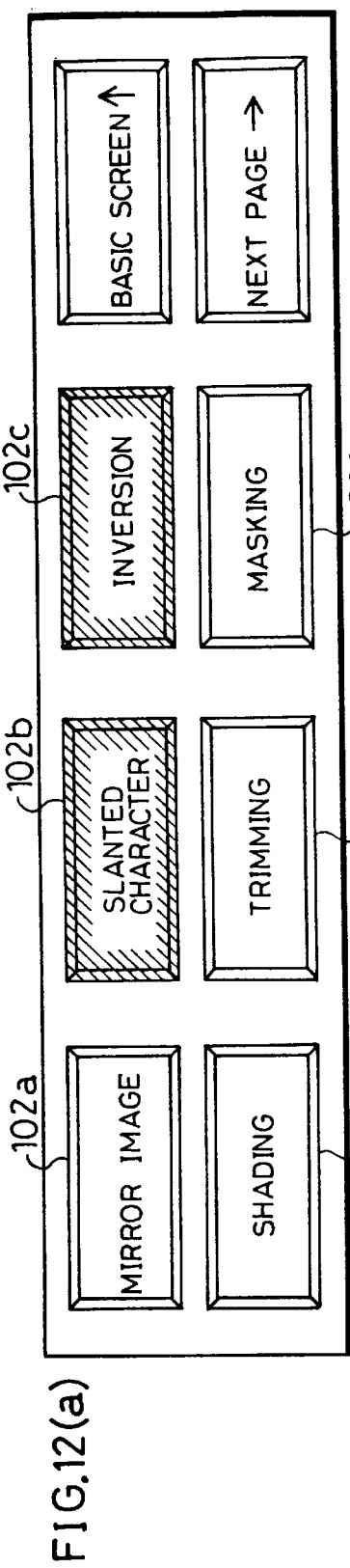
FIG. 12(a) is an explanatory drawing that shows a selected state of image-editing functions on the first-function setting screen shown in FIG. 6(b)
Figure 12B:
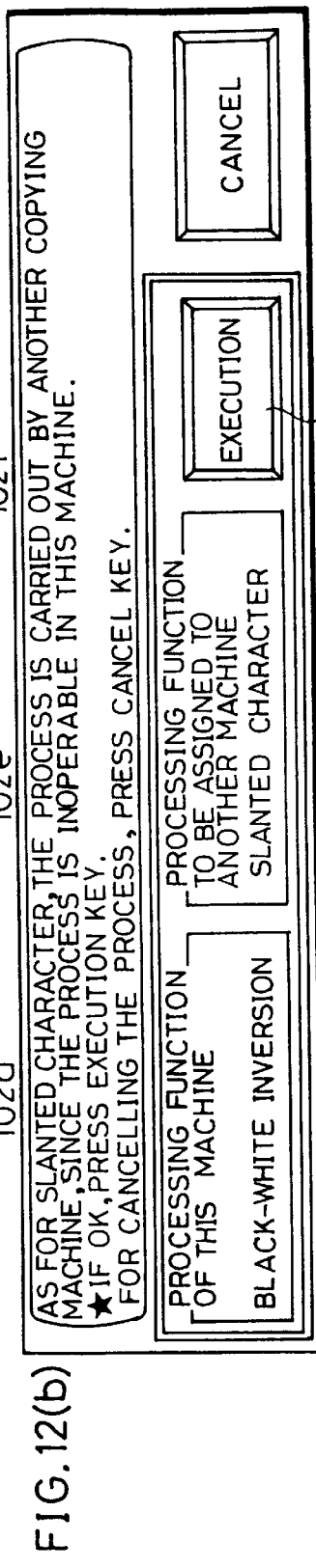
FIG. 12(b) is an explanatory drawing that shows a display state on the liquid crystal display that corresponds to an operation at S4 shown in FIG. 1.
Figure 12C:
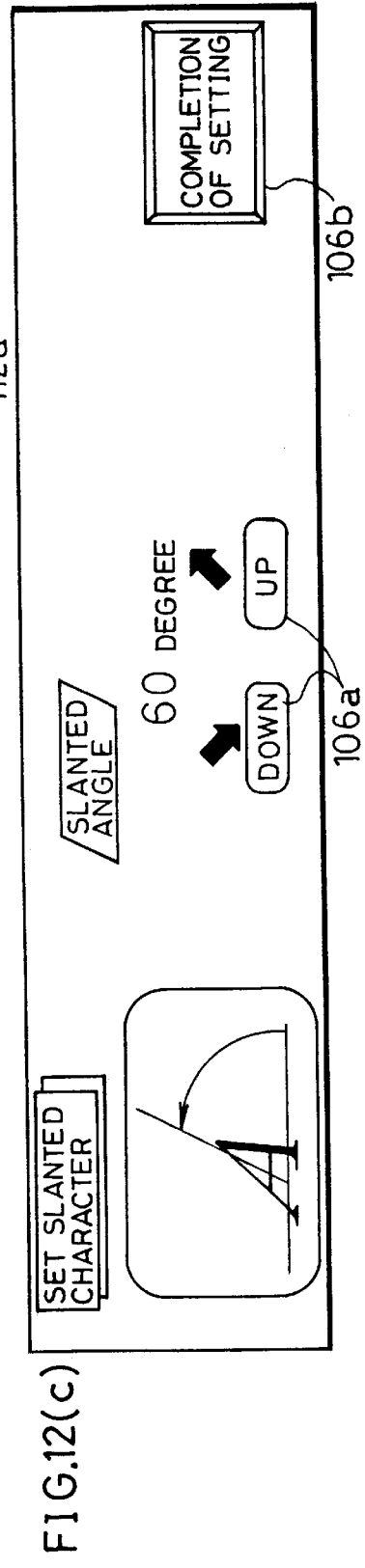
FIG. 12(c) is an explanatory view that shows an inclined-font setting screen of the liquid crystal display.

Transitions to the respective screens are carried out in accordance with the sequence shown in FIG. 10. In other words, in the liquid crystal display 1, the basic screen is first displayed, and on this display screen, when any of the function setting region, image-quality setting region, post-process setting region and initial setting region is pressed, the display screen is allowed to transfer to the screen corresponding to the specified region. For example, if the function setting region is pressed, the screen is switched to the first-function setting screen, and if the operation region for making a transition to the next screen is pressed on this screen, the screen is switched to the second-function setting screen (NEXT-function setting screen). Here, if the operation region for making a transition to the basic screen is pressed, the screen is switched to the basic screen. Moreover, for example, in the first-function setting screen, when a slanted-character function setting region is pressed, the screen is switched to the slanted-character setting screen as shown in FIG. 12(c). This screen corresponds to, for example, function-2 parameter setting screen in FIG. 10. The slanted-character setting screen is provided with an angle input key 106a that is a setting region for a slanted angle and a setting completion key 106b that is an input region for setting completion. Furthermore, the resulting slanted angle is displayed.

Additionally, in the first- and second-function setting screens, when a desired function setting region is pressed, the screen of the liquid crystal display 1 is switched to a corresponding parameter setting screen such as the above-mentioned slanted-character setting screen.

Here, Table 1 shows examples of image-editing functions and their process operations that are provided in the present image-forming system and that can be set by the operations of the above-mentioned function setting regions. However, the image-editing functions that are set in the present image-forming system are not intended to be limited thereby. For example, other functions, such as a function for making a fair copy of hand-written characters and images, may be provided.

TABLE 1

| Image-editing functions | Outline of processing |
| --- | --- |
| Independent change in magnification | Sets different magnifications with respect to the longitudinal and lateral directions of a document image. |
| Sharpness | Adjusts the image quality of a copy. |
| Margin for binding | Makes a margin in a copy with a desired width. |
| Erasure of frame | Makes a copy with its frame erased. |
| Centering | Makes a copy virtually in the center of a sheet of copy paper. |
| 2 copies in one set | Copies a book. |
| Address copy | Outputs a copy image with an address synthesized therein. |
| Multishot | Combines and copies images from a plurality of pages on one sheet. |
| Trimming | Copies only a specified portion. |
| Masking | Makes a copy with a specified portion erased. |
| Shifting function | Makes a copy with a document image shifted to a desired position. |
| Composite function | Composes and copies a plurality of document images. |
| Black-white inversion | Makes a copy with a negative/positive inversion. |
| Net process | Makes a copy with a net providing/erasing process. |
| Shading | Makes a copy with shades. |
| Framing | Makes a copy with its image framed. |
| Slanted image | Makes a copy with its image slanted. |
| Mirror image | Makes a copy with its image inverted like a mirror image. |
| Repeat copy | Copies a plurality of the same images on one sheet. |
| 2 in 1 copy | Copies a set of two documents on one sheet. |
| Dated copy | Makes a copy with the date written therein. |
| Center mark | Copies an image with a center mark added thereto. |
| Enlarged divisional output | Copies an enlarged document onto a plurality of sheets in a divided manner. |

TABLE 1-continued

| Image-editing functions | Outline of processing |
| --- | --- |
| Translation | Translates a document. |
| High-image-quality process | Makes a copy using a high-image-quality process. |

Figure 11:
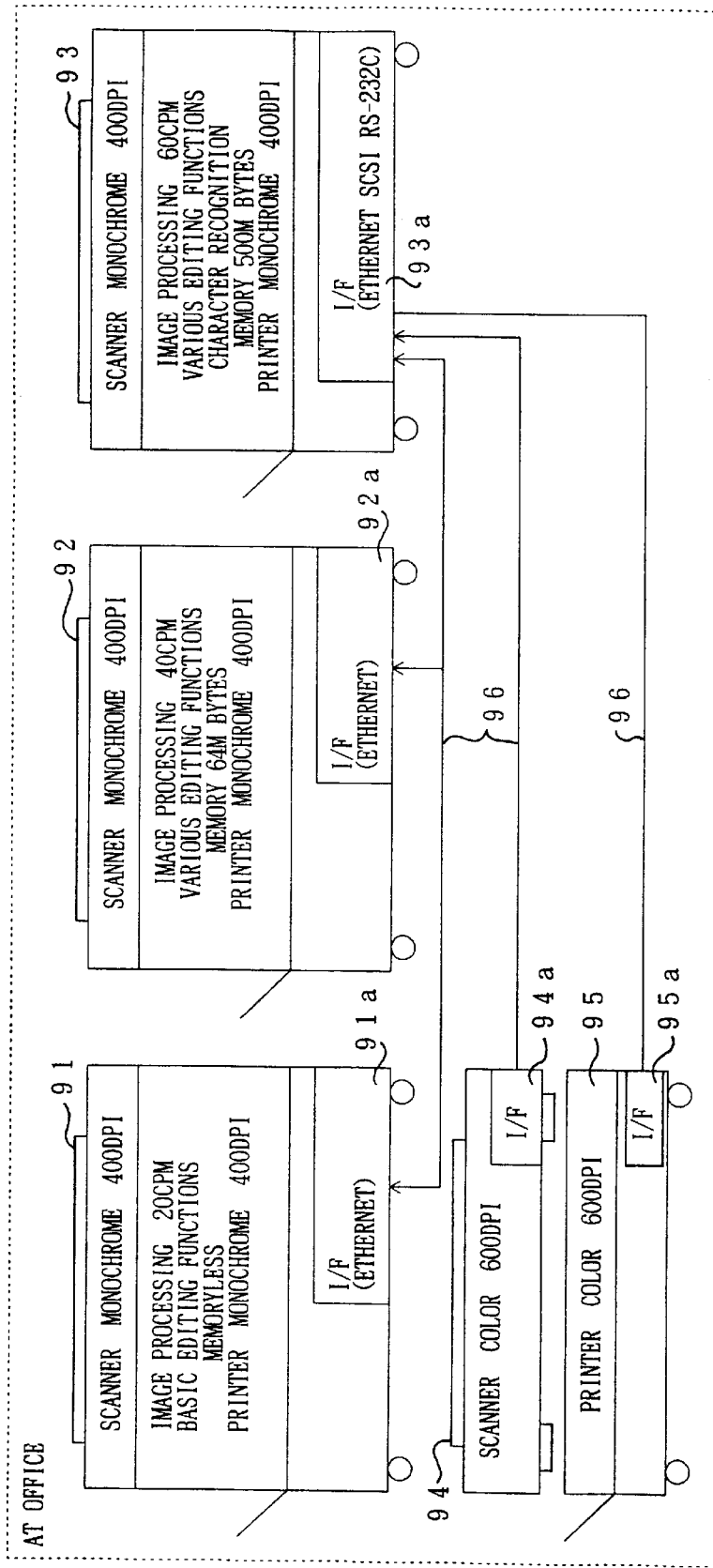
FIG. 11 is a block diagram that shows a schematic construction of the image-forming system in accordance with one embodiment of the present invention.

For example, as shown in FIG. 11, the present image-forming system is composed of digital information apparatuses installed in an office. The image-forming system shown in FIG. 11 is provided with digital copying machines 91 through 93, a scanner 94 and a printer 95 that functions as image-forming apparatuses.

The digital copying machine 91 is a low-function, inexpensive, memoryless one, and merely has basic editing functions. Here, "memoryless" means that although a page memory capable of storing a lot of image data is not provided, at least a line memory required for carrying out normal jobs for image data in a digital copying machine is provided. Moreover, basic editing functions are those functions, such as black-white inversion, that can be carried out without the need for a page memory. Moreover, in the digital copying machine 91, the scanner function, provided by the scanner unit 40 in FIG. 2, has a resolution of 400 DPI in the case of a monochrome process. Moreover, the copy speed is set to 20 CPM (20 sheets/minute), which is typical for low-speed models. Furthermore, in the digital copying machine 91, the printer function, provided by the laser printer section 32, is set to 400 DPI in the case of a monochrome process, and an interface (I/F) 91a is also installed.

The digital copying machine 92 has a scanner function of a resolution of 400 DPI in the case of a monochrome process, a printer function of 400 DPI in the case of a monochrome process, and a copy speed of 40 CPM, which are typical for middle-class apparatuses. Further, there are installed various editing functions, a memory of 64 bytes (a capacity corresponding to 4 pages in A4-size with 400 DPI, 8 bits/pixel) that functions as a page memory, and an interface 92a. The memory is referred to as the main memory 73a shown in FIG. 4.

The digital copying machine 93 has a scanner function of a resolution of 400 DPI in the case of a monochrome process, a printer function of 400 DPI in the case of a monochrome process, and a high copy speed of 60 CPM. Further, there are installed various editing functions, a character-recognizing function, a coding function for bit data, and a memory of a large capacity of 500 M bytes (a capacity corresponding to 100 pages in A4-size with 400 DPI, 8 bits/pixel at a compression rate of ¼) that functions as a page memory, which are regarded as high-class functions. Therefore, the digital copying machine 93 makes it possible to carry out a process for changing the order of pages of image data and also to store document data in various formats. The above-mentioned memory corresponds to a memory including the main memory 73a and the hard disk 73b shown in FIG. 4. Further, the digital copying machine 93 is provided with an interface 93a.

The scanner 94, which can read color images, has a resolution of 600 DPI. The printer 95, which can print color images, has a recording density of 600 DPI. These scanner 94 and printer 95 is provided with an interface 94a and an interface 95a respectively.

The digital copying machine 91, digital copying machines 92 and 93, scanner 94 and printer 95 are connected through the respective interfaces 91a to 95a and the communication line 96, and allowed to transmit and receive data with each other. Therefore, the communication apparatus is constituted by the interfaces 91a to 95a, communication line 96 and PCU 74.

Kinds of data handled by the communication apparatus are, for example, bit data such as image data (gray scale data for every pixel, e.g., 8 bits, 256 gray scales) and command codes. The communication apparatus is capable of transmitting high gray-scale images, such as nature images, highly accurately. Moreover, the communication apparatus is capable of reducing data amount of text data, such as characters, by coding it and then transmitting the coded data at a high speed. Especially, image data with gray scales such as nature images may be generally handled with the Dither technique (method) that is one of area gray scale methods for compressing data amount, the error-dispersion method, and other methods, and then transferred. The error-dispersion method is carried out in advance in respective devices. Moreover, the format for transmitted data is set in accordance with a format that can be handled by the respective digital copying machines 91 to 93 or the printer 95. Therefore, for example, in a digital copying machine having received image data that is to be outputted onto a sheet of paper, the image data is inputted to the laser printer section 32 and then converted to a data row required when writing in the image-processing section; thereafter, the image data is outputted.

The interfaces 91a to 95a are defined by protocol and communication speed that are individually specified. An appropriate standard is therefore selected depending upon content of transmitted data (e.g., data amount), relative locations of the devices (e.g., distances) etc. Moreover, in the present image-forming system, devices are not always in one-to-one connection with each other. A plurality of devices may be connected to the common communication line 96, as in a dizzy chain. Therefore, the devices are provided with respective addresses so that the interfaces 91a to 95a can recognize the receiver of image data. Moreover, the interfaces 91a through 95a employ as the standard, for example, Ethernet that is a network capable of transferring image data at high speeds. Furthermore, the interfaces 91a through 95a are compatible with commonly-used standards such as SCSI (Small Computer System Interface) and RS-232C.

Moreover, each of the digital copying machines 91 through 93 has a FAX function for transmitting and receiving data through a telephone line and a printer mode for printing document data released from a personal computer, a word processor and other devices.

Moreover, in general, digital copying machines that are installed in the respective offices have a lot of variations in their functions depending on their prices, capacities of image memory and other aspects, and various types of them are used depending on purposes for use in respective offices and degrees of demand for various functions. Therefore, with respect to the digital copying machines installed in the offices, a number of commodities may be used without being limited to the digital copying machines 91 through 93.

Here, the following table 2 shows one example of image-editing functions that are provided in the digital copying machines 91 through 93 in accordance with the embodiment of the present invention.

TABLE 2

| Image-editing functions | Copying Machines | | |
| --- | --- | --- | --- |
| | 91 | 92 | 93 |
| Independent changes in magnifications | ✓ | ✓ | ✓ |
| Sharpness | | ✓ | ✓ |
| Margin for binding | ✓ | ✓ | ✓ |
| Erasure of frame | ✓ | ✓ | ✓ |
| Centering | | ✓ | ✓ |
| 2 copies in one set | | ✓ | ✓ |
| Address copy | | | ✓ |
| Multishot | | ✓ | ✓ |
| Trimming, Masking | | ✓ | ✓ |
| Shifting function | | ✓ | ✓ |
| Composite function | | | ✓ |
| Black-White inversion, Net process | ✓ | ✓ | ✓ |
| Shading, Framing | | | ✓ |
| Slanted image, Mirror image | | | ✓ |
| Repeat copy | ✓ | ✓ | ✓ |
| 2 in 1 copy | | | ✓ |
| Dated copy, Center mark | | | ✓ |
| Enlarged divisional output | | | ✓ |
| Translation | | | ✓ |
| High-image-quality process | | | ✓ |

The present image-forming system is so arranged that the digital copying machine 93 having the most image-processing functions and the memory 73 of a large capacity functions as the main image-forming apparatus, i.e., the main digital copying machine, and the other digital copying machines 91 and 92, scanner 94 and printer 95 are connected to the digital copying machine 93. Moreover, the other digital copying machines 91 and 92 are so arranged that they can use the image-processing functions and the memory 73 of the digital copying machine 93. When the image-processing functions are to be used, image data is transmitted from one of the digital copying machines 91 and 92 to the digital copying machine 93, which then carries out predetermined image processing on the above-mentioned image data. The resulting image data is returned to, for example, the original digital copying machine and then outputted onto a sheet of paper as an image. When the memory 73 is to be used, image data is transmitted from one of the digital copying machines 91 and 92 to the digital copying machine 93, the memory 73 of which stores the image data. The image data is returned to, for example, the original digital copying machine when necessary. Such an arrangement enables the present image-forming system to be composed of at least two, for example, digital copying machines that have different image-processing functions from each other.

With the above arrangement, an explanation will be given in detail of the operation of the present image-forming system in reference to the flow chart of FIG. 1. Here, it is supposed that "black-white inversion" and "slanted character" are selected as image processing that is applied to a document image in the digital copying machine 91. Additionally, the function-setting screen of the liquid crystal display 1 of the digital copying machine 91 is designed to display functions provided in the digital copying machine 93 as well.

In this case, when the function-setting key 101a is pressed (S1) on the basic screen of the liquid crystal display 1 shown in FIG. 6(a), the screen of the liquid crystal display 1 is switched to the first-function setting screen as shown in FIG. 6(b). Next, in this state, when a slanted-character setting key 102b and an inversion setting key 102c are pressed (S2), the regions of the slanted-character setting key 102b and the inversion setting key 102c are displayed in an inverted state as shown in FIG. 12(a) on the screen of the liquid crystal display 1. These inverted displays indicate that the slanted-character setting key 102b and the inversion setting key 102c have been pressed.

Next, the PCU 74 in the digital copying machine 91 makes a judgement as to whether or not the set functions include any function that is inoperable in the digital copying machine 91 (S3). In this case, as shown in Table 2, the digital copying machine 91 does not have a "slanted-character" function although it has a "black-white inversion" function. Therefore, the result of judgement at S3 is "YES". Accordingly, the information that "slanted character" is inoperable in the digital copying machine 91 and the information that the digital copying machine 93 should be used for processing "slanted character" are displayed on the liquid crystal display 1 (S4). Such a display screen is shown in FIG. 12(b).

Successively, when an execution key 112a, placed on the above-mentioned display screen, is pressed (S5), the screen of the liquid crystal display 1 is switched to a slanted-character setting screen shown in FIG. 12(c). Then, the angle of the "slanted character" is inputted through an angle input key 106a that is placed on the display screen, and when a setting completion key 106b is pressed, "black-white inversion", which is operable in the digital copying machine 91, is carried out (S6). In this case, image data that is to be processed is, for example, data of a document image that has been read by the scanner section 31. Furthermore, since the digital copying machine 91 does not have a page memory and only has a line memory, the image data is successively processed as image data that is read line by line. Here, the line memory is installed, for example, inside the PCU 74, and used when the PCU 74 is operated.

Next, the image data that has been subjected to the "black-white inversion" process is successively transferred to the digital copying machine 93 (S8). In this case, a control-use command code, that is, a command code for instructing the "slanted-character" process, and image data that is to be subjected to the "slanted-character" process are inputted to the digital copying machine 93 through the interface 91 a, the communication line 96 and the interface 93a. When the communication apparatus uses a general purpose network, a scramble process is carried out on the image data before the transmission of the image data (S7). In addition, at the connecting sections of the interfaces 91a through 95a to the communication line 96, modem are provided to convert digital data into signals that are appropriate for transmission via the communication line 96.

The scramble process is carried out so as to prevent the image data from leaking out. In other words, when the communication apparatus carries out communication via a general purpose network, a number of unidentified people can freely access the network, and there is a possibility that data flowing through the network might be illegally taken by a person such as a hacker. Therefore, such leakage of image data is prevented by the scrambling process.

The digital copying machine 93, on the other hand, unscrambles the data sent from the digital copying machine 91 (S9). Then, the digital copying machine 93 confirms the contents of process that are requested through a command code, and carries out a "slanted-character" process on the image data that has already subjected to the "black-white" inversion process in accordance with the contents of the request (S10).

After the processes on the image data are completed, the digital copying machine 93 carries out the scramble process (S11) on the image data that are already subjected to those processes. Then, in the reverse order from the previous case, the digital copying machine 93 sends back the image data to the digital copying machine 91 that is the sender of the image data (S12).

The digital copying machine 91 unscrambles the received data (S13) and outputs the image data on a sheet of paper as an image (S14). The digital copying machine 91 here operates in the same manner as the digital copying machines 30 that is already explained.

In S5, if a predetermined time elapses before the execution key 112a is pressed, only the "black-white" inversion process, a process that can be carried out by digital copying machine 91, is carried out (S16), and then the operation proceeds to S14. Measurement of the above-mentioned predetermined time is done by a timer provided in the PCU 74. In addition, if the set functions include no function that is inoperable in the digital copying machine 91 in S3, the operation proceeds to S16.

As mentioned above, in the present image-forming system, if an image-editing function that is not provided in the digital copying machine 91 is selected, the image-editing can be carried out by assigning it to the digital copying machine 93. Therefore, the digital copying machines 91 and 92 other than the digital copying machine 93 are not necessarily provided with as high image-editing functions and the like as the digital copying machine 93 is.

Figure 1:
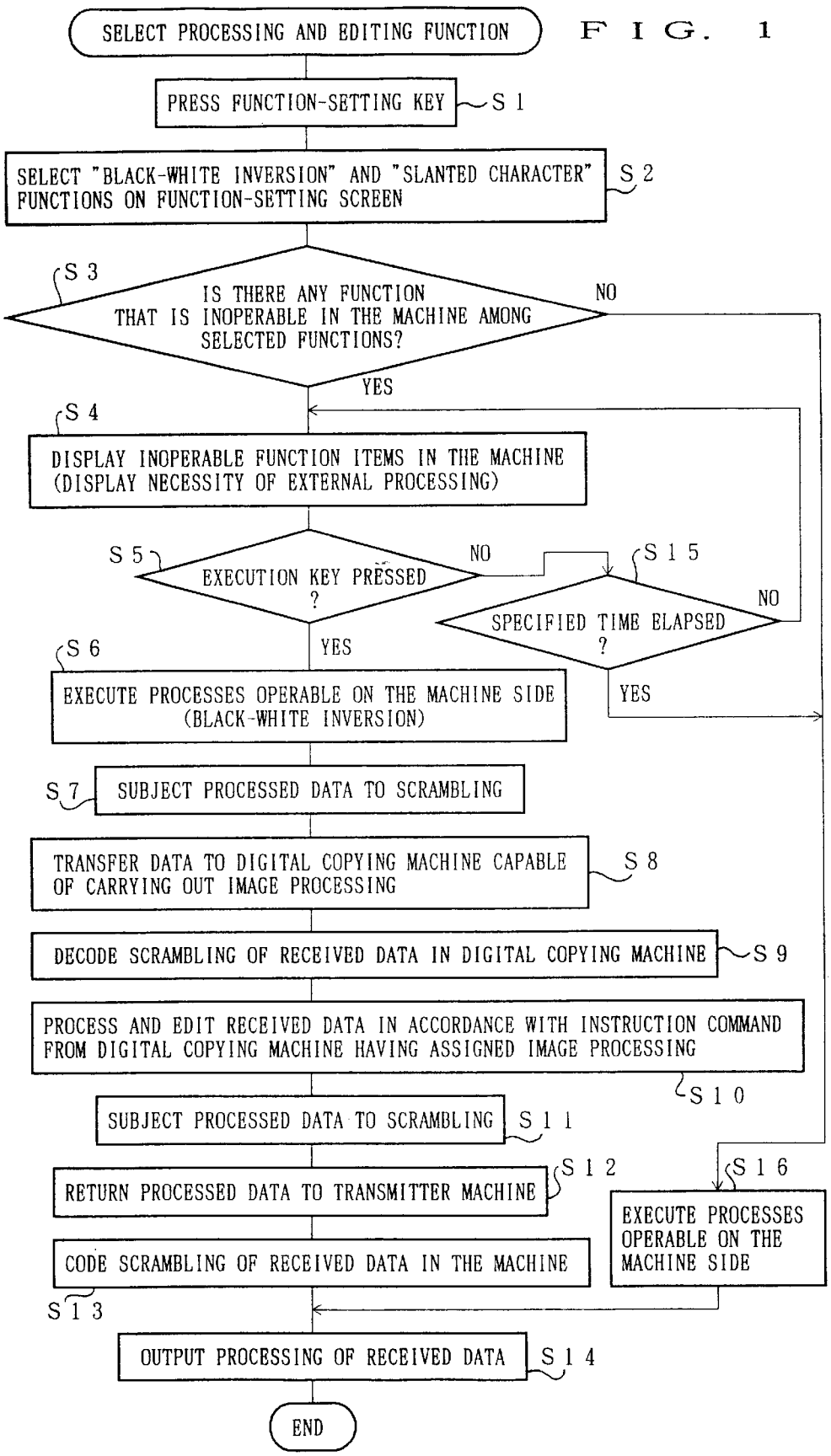
FIG. 1 is a flow chart that shows operations of an image-forming system in accordance with one embodiment of the present invention.

In the example shown in FIG. 1, the operation is designed so that the process is assigned to the digital copying machine 93 after the execution key 112a is pressed in S5; however, the operation may be alternatively designed so that if a function that is inoperable in the digital copying machine 91 side is selected in S3, the process is assigned to the digital copying machine 93 without confirming in S5 whether or not the execution key 112a has been pressed.

In the example shown in FIG. 1, the operation is designed so that the image data already subjected to processes in the digital copying machine 93 is returned to the digital copying machine 91 that is the sender of the image data, and the image is then outputted by the digital copying machine 91; however, the operation may be alternatively designed so that an apparatus to which the already processed image data is returned is selected in accordance with various conditions, and the image is outputted by the selected digital copying machine or printer.

Figure 13:
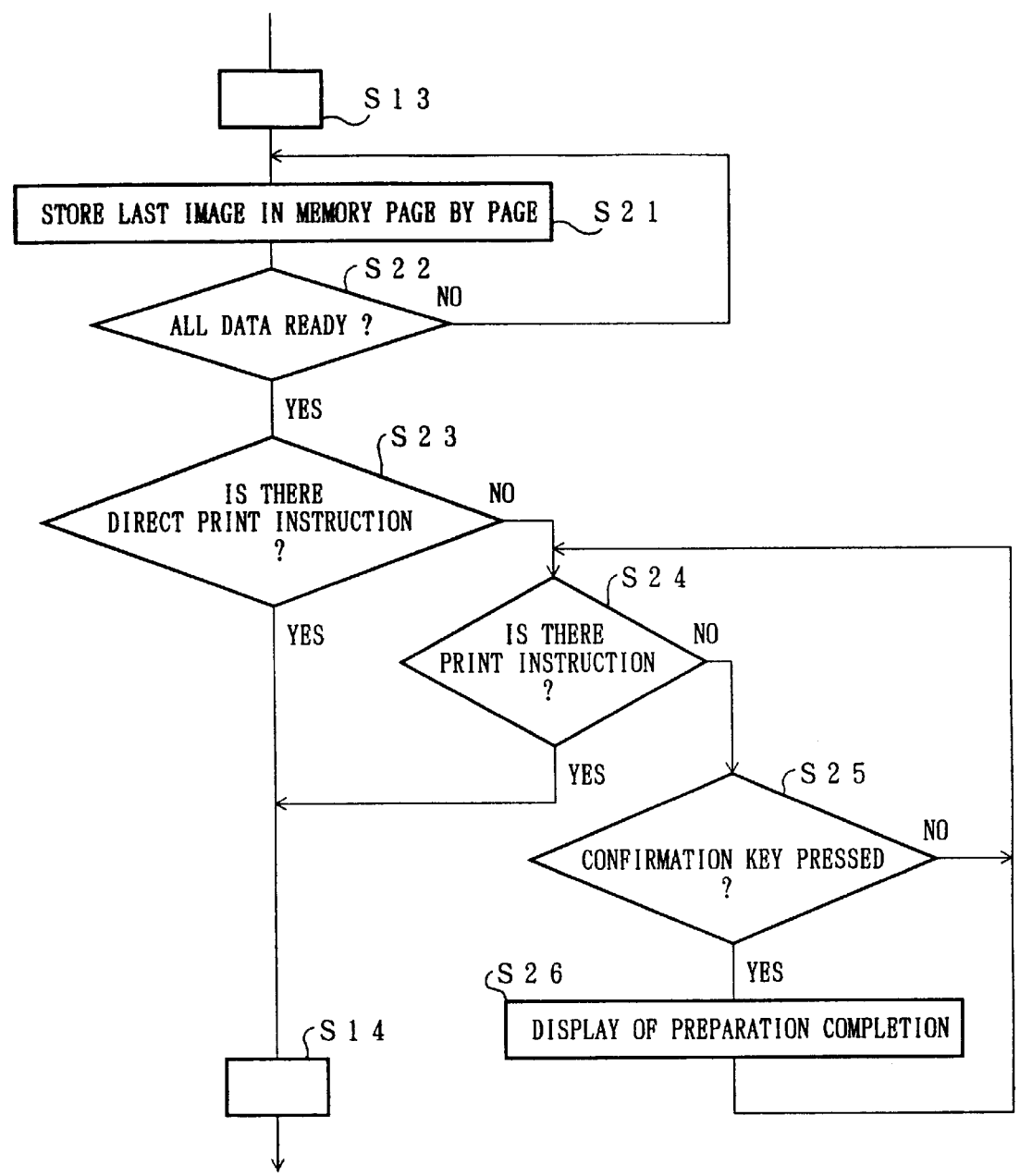
FIG. 13 is a flow chart that shows another example of the operation of the image-forming system shown in FIG. 1.

In the operation shown in FIG. 1, the present image-forming system may be arranged so that the operations S21 through S26 shown in FIG. 13 are carried out between the operations S13 and S14. The memory 73 capable of storing image data for a plurality of pages is needed to carry out these operations. Therefore, the operations are carried out by a communicating operation of the digital copying machines 92 and 93 in the image-forming system shown in FIG. 11.

The operations make it possible to select whether the image data returned from the digital copying machine 93 that has already carried out the image processing is either ① outputted by the laser printer section 32 upon reception, or ② temporarily stored in the memory 73 and outputted from the laser printer section 32 in accordance with instruction of the user. Moreover, the operations makes it possible ③ to confirm whether or not the processing by the digital copying machine 93 that is assigned the processing has been completed and the processed image data has been returned. Carrying out these operations is made possible for following reasons.

Figure 14:
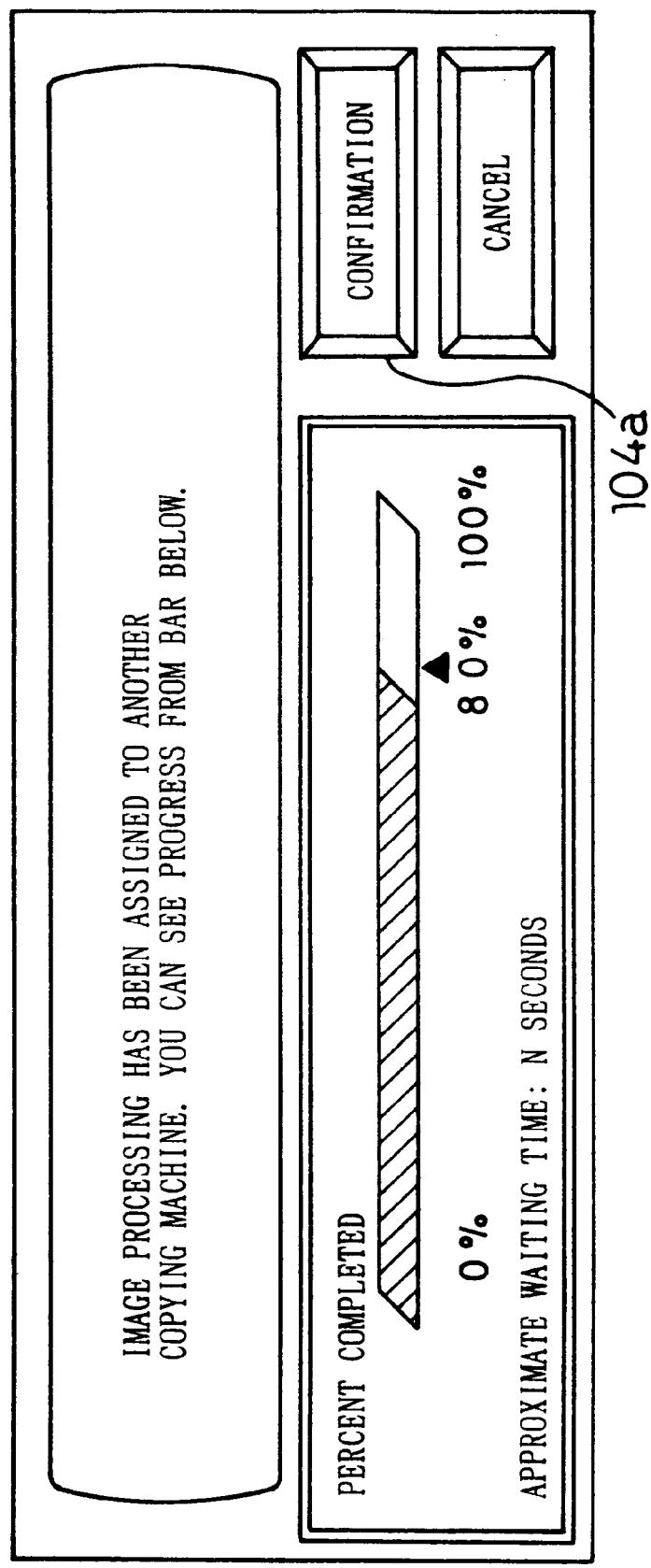
FIG. 14 is an explanatory drawing that shows a display state on the liquid crystal display in a case where a confirmation key at S25 is pressed before a digital copying machine completes the image processing in the operation shown in FIG. 13.
Figure 15:
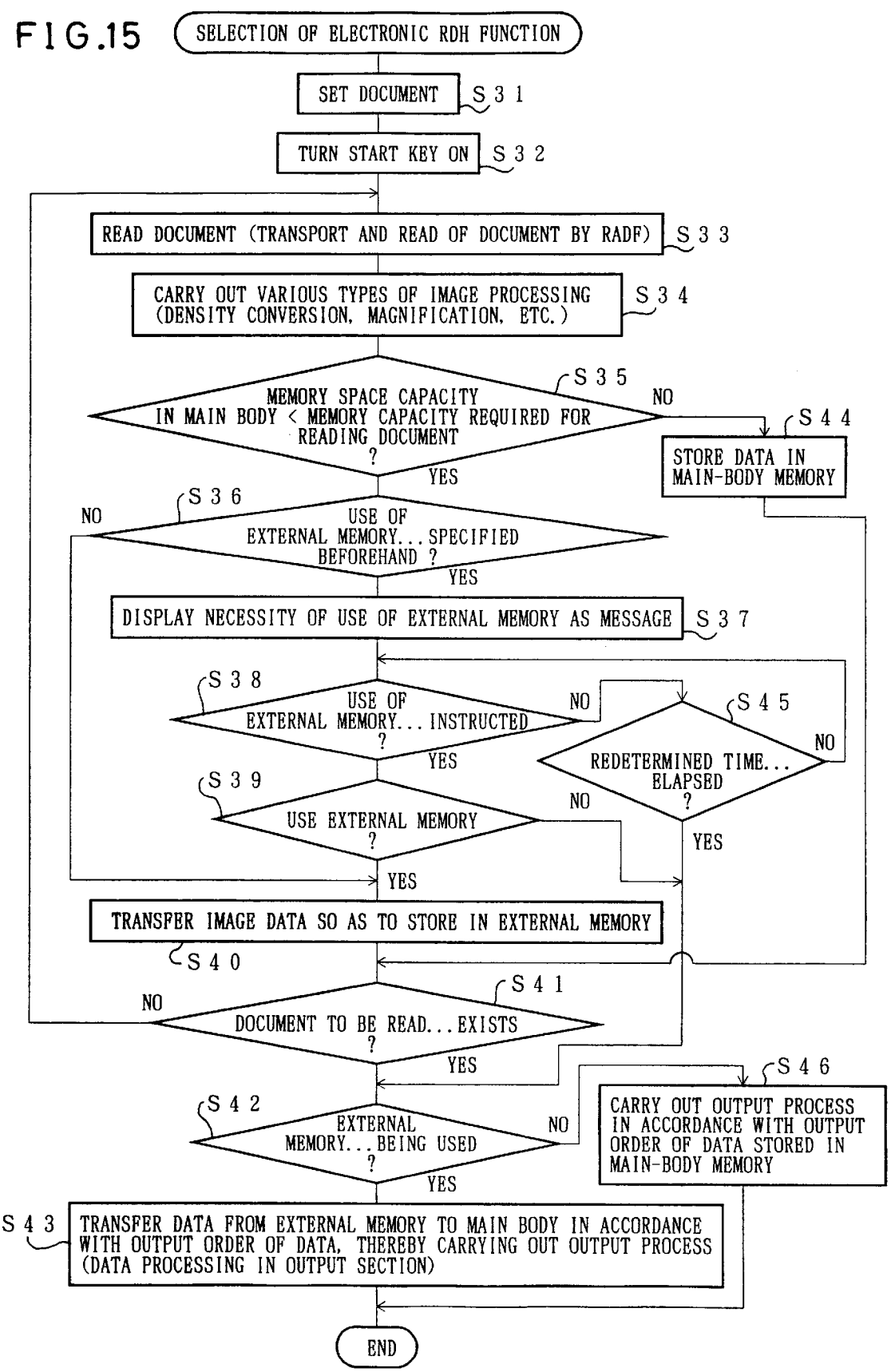
FIG. 15 is a flow chart that shows another operation of the image-forming system shown in FIG. 11, that is different from the operation shown in FIG. 1.

Normally, there are two kinds of image processing: the one that takes a short period of time to carry out, and the one that takes a long period of time to carry out. The image processing that takes a long period of time to carry out normally needs complex processes, such as the translation function. Besides, if an image-processing function that takes a long time to carry out is set, it is necessary to inform the user that the process takes a long time. Therefore, the digital copying machines 91 through 93 are designed, for example, to be capable of displaying "Waiting time: N seconds" on the liquid crystal display 1, as shown in FIG. 14. Meanwhile, the user may leave the digital copying machine 92 unattended after confirming the above-mentioned display. Therefore, the image processing may be completed and the image may be outputted when the user is not present. In this case, if there is another copied document on a paper output tray of the digital copying machine 92, the above-mentioned image that is already subjected to the image processing is mixed with another copied document. In order to prevent such an accident, the present digital copying machine is designed so that the user can select either the operation ① or ①.

In addition, when the user temporarily leaves and then returns to the digital copying machine 92, it is convenient if the user can see the progress of the processing, for example, whether the assigned process is completed, with the operation ③.

FIG. 14 shows a display in the operation ③. The progress of the image processing is indicated in percent. The progress indicated as 100% means that the image data that is already subjected to the image processing is stored in the memory 73.

Next, referring to FIG. 13, the following description will discuss the above-mentioned operation.

In the digital copying machine 92, after the process of S13, the image data that is already processed in the digital copying machine 93, that is, the final image data, is stored in the memory 73 page by page (S21). Thereafter, as the storing is completed with respect to the previous image data (S22), the PCU 74 judges in advance whether or not a direct print instruction has been inputted (S23). If there is a direct print instruction, the operation proceeds to S14 and the laser printer section 32 outputs the image data. The direct print instruction is an instruction to order the laser printer section 32 to output the processed image data as soon as the digital copying machine 92 receives the processed image data. The order of the instruction is inputted by pressing the start key 15 shown in FIG. 5, for example, after a predetermined image-processing function is set.

In addition, if no direct print instruction is inputted in S23, the processed image data is not outputted and the PCU 74 is in a stand-by state until a print instruction is inputted by the user pressing the start key 15. In this state, for example, if the start key 15 is pressed, the operation proceeds to S14, and the processed image data is outputted. If a confirmation key 104*a* is pressed in the above-mentioned stand-by state, since the image processing is completed, the display of the liquid crystal display 1 shown in FIG. 14 indicates that the progress is 100% and that the waiting time is 0 second, and also shows a message that the image processing is completed.

Meanwhile, FIG. 14 shows a display example of the liquid crystal display 1 when the confirmation key 104*a* is pressed before the image processing in the digital copying machine 93 is completed.

In addition, the present image-forming system is arranged so that digital copying machines can copy documents by using the memory 73 of the digital copying machine 93. Here, the operation of the present image-forming system of this kind is provisionally explained with the communicating operation of the digital copying machines 92 and 93. In this case, the digital copying machine 92 is provided with an electronic RDH function. This electronic RDH is for temporarily storing all image data of, for example, a 10 page document in a memory, and sequentially calling the image data page by page from the memory in a repeated manner until 20 sets of copied documents are made. The electronic RDH can be selected by operating the function-setting key 101*a* shown in FIG. 6(*a*). In this case, an electronic RDH setting key is displayed, for example, on the second-function setting screen shown in FIG. 6(c) by operating the function-setting key 101*a*.

The digital copying machine 92 has a page memory of 64 M bytes as the memory 73. Therefore, the page memory can successively read 4 pages in A4-size document of the image data of 256 gray scales. This capacity is large enough to copy documents by temporarily storing document image in a normal copying process. However, if, for example, 10 pages of document image is to be copied for a plurality of sets with the electronic RDH, the page memory is short for 6 pages. Therefore, in this case, the memory 73 of the digital copying machine 93 is used to carry out the electronic RDH. Referring to the flow chart in FIG. 15, the following description will discuss the operation in this case.

The electronic RDH is selected in the digital copying machine 92, and documents are set on the RADF 36 shown in FIG. 2 (S31). As the start key 15 shown in FIG. 5 is turned ON (S32), the RADF 36 sequentially transports the documents, image of which is to be read by the scanner unit 40. The image data thus obtained is sequentially stored in the memory 73 (S33). The image data is sequentially subjected to the density conversion process, the magnification process in accordance with the setting, and other processes in the image-data processing section 71 (S34). If the electronic RDH setting key is operated, an external-memory selection key 121*a* shown in FIG. 16(*a*) is set on the liquid crystal display 1, and memory capacity is indicated by an available memory amount display section 121*b*. The message display shown in FIG. 16(*a*), however, is not carried out.

Thereafter, during reading of the document by the scanner unit 40, the empty capacity of the memory 73 becomes less than the memory capacity required for reading the remaining document (S35). If the external-memory selection key 121*a* is not pressed in advance (S36), a message indicating that an external memory is needed is displayed on the liquid crystal display 1 (S37) as shown in FIG. 16(*a*).

Thereafter, the user presses the external-memory selection key 121*a* (S38), the liquid crystal display 1 displays a message shown in FIG. 16(*b*). On this screen, the external-memory selection key 121*a* is displayed in an inverted state, and the display at the available memory amount display section 121*b* is a capacity display including the capacity of the memory 73 of the digital copying machine 93.

Next, as the user presses a continuation key 121*c* in response to the message shown in FIG. 16(*b*) (S39), the image data is transmitted to the digital copying machine 93 (S40) to use the memory 73 of the digital copying machine 93 as the external memory. The display of the liquid crystal display 1 at this time is shown in FIG. 16(*c*). The image data transmitted in this case is either image data sequentially read afterwards or image data already read and stored in the memory 73. The transmission operation of the image data is carried out in the same manner as the sending operation of the image data mentioned earlier. The digital copying machine 93 stores the received image data in the memory 73 thereof.

The operations S33 through S40 are repeated until there is no more document to be read (S41). Thereafter, as the reading of all the documents is completed, if the external memory is in use (S42), the image data is transmitted from the digital copying machine 93 to the digital copying machine 92 in accordance with an output sequence and outputted as images on sheets of paper (S43). In this case, the images are outputted sequentially from the last page of the documents. Moreover, the image data is read from respective memories in the same manner as it is written: if the image data is read from the memory 73 of the digital copying machine 92, it is read through a data line in the digital copying machine 92, and if the image data is read from the digital copying machine 93, it is read through the communication line 96.

Meanwhile, in S35, if the empty capacity of the memory 73 of the digital copying machine 92 is more than the memory capacity required for reading the remaining document, the image data is continuously stored in the memory 73 (S44), and the operation proceeds to S41. After the operations S41 and S42, the image data stored in the memory 73 is outputted on sheets of paper in accordance with the output sequence (S46).

If a predetermined time elapses before the external-memory selection key 121a is pressed in S38 (S45), the operation proceeds to S42. Then the image data so far stored in the memory 73 is outputted on sheets of paper in accordance with the output sequence in S46.

In the above description, the page memory of the digital copying machine 92 is arranged to be used only for storing the image data read from the document image; however, a region corresponding to a few pages that is a part of the page memory may be arranged to be always set aside for control operation of the digital copying machine 92.

Moreover, the present image-forming system is arranged so that if the digital copying machine 93 that functions as the main digital copying machine is assigned by another digital copying machine a process, such as image processing and storage, that surpasses the processing abilities of the digital copying machine 93, the display that the processing cannot be carried out in the digital copying machine 93 is carried out by the liquid crystal display 1 of the digital copying machine that has assigned the process. The operation in this case is as follows. The PCU 74 of the digital copying machine 93 confirms contents of assignment by another digital copying machine. Next, if the assigned process is operable, the digital copying machine 93 carries out the process; if inoperable, the digital copying machine 93 sends data indicating that the process is inoperable in the digital copying machine that has assigned the process. The digital copying machine that has assigned the process displays the data on the liquid crystal display 1 upon receiving it.

Next, the following description will discuss a management system for managing all digital apparatuses in the present image-forming system.

The digital copying machine 93 that functions as the main digital copying machine grasps processing functions of the other digital copying machines, i.e., the digital copying machines 91 and 92, that make up the present image-forming system, and the total image-processing abilities of the system. The digital copying machine 93 is also designed to convey information about the total processing abilities of the system to other digital copying machines.

Referring to the flow chart in FIG. 17, the following description will discuss operations in this case.

As the system is turned ON, the digital copying machine 93 starts communication with other digital copying machines (S51), and gathers from the other copying machines information about image-processing functions thereof (S52). Thereafter, the digital copying machine 93 sorts out and manages the obtained information (S53), and transmits the information to the other digital copying machines (S54).

The digital copying machines, including the digital copying machine 93, are thereby enabled to display, on the liquid crystal displays 1, image-processing functions of the digital copying machines incorporated in the image-forming system. Therefore, the user of the respective digital copying machines can confirm the functions of the digital copying machines according to the display.

Besides, the present image-forming system is arranged so that in a case when image processing is assigned to the digital copying machine 93 that functions as the main digital copying machine, and also, for example, in a case when this digital copying machine 93 cannot carry out the image processing in accordance with the assignment, the digital copying machine 93 further assigns the process to a digital copying machine that is capable of carrying out the processing. In this case, the digital copying machine 93 stores in the memory 73 data about contents of the image-processing assignment and image data to be processed, that have been transmitted from the digital copying machine that has assigned the processing, and further transmits the data to a selected digital copying machine and assigns the processing thereto. In order to carry out these operations, the digital copying machine 93, that has a large memory capacity, is appropriate as the main digital copying machine. In the arrangement shown in FIG. 11, for example, the digital copying machine that assigns the processing corresponds to the digital copying machine 91, and the digital copying machine selected by the digital copying machine 93 as the digital copying machine that carries out the processing corresponds to the digital copying machine 92.

Conditions for the digital copying machine selected by the main digital copying machine are: for instance, a digital copying machine that is standing by, has an ability to carry out processing at high speeds, has image-processing functions of a new version, and has a large enough empty capacity left in the memory 73.

To explain the above-mentioned image-processing function, constant efforts are made to develop a new image-processing function or an image-processing function of a higher level, and as a result, the level and processing speed of the image-processing function are being improved. Therefore, every time a new digital copying machine is introduced in the market, the digital copying machine is provided with an image-processing function of the latest version at the time. Also in the same manner, the capacities of memories for storing image data are becoming larger, and the prices thereof are falling; therefore, every time a new digital copying machine is introduced into the market, memories have larger capacities. Therefore, in a case when the user purchases a new digital copying machine and connects the digital copying machine as part of the image-forming system, the superiority order of the digital copying machines in the system with respect to functions thereof is changed, and also the image-forming system includes digital copying machines that have the same image-processing function and that have memories of the same capacity. Therefore, if a digital copying machine of the latest version or of the largest memory capacity is selected from the digital copying machines having the same image-processing functions as the copying machine that is to be assigned the image processing, the image data can be processed at high speeds and with high quality. The same conditions for selection are applied in a case when the main digital copying machine is set.

Moreover, if a digital copying machine that is standing by, that has an ability to carry out processing at high speeds, and that has an image memory with a large enough empty capacity is selected as the copying machine that is to be assigned the image processing, the image processing can be carried out in a short period of time. Therefore, the image-forming system can quickly respond to an instruction and demand of the user.

In order to carry out the above-mentioned operations, the digital copying machine 93 is provided with a management function for grasping present operation states of the other digital copying machines, as well as the above-mentioned management function for the total processing abilities of the system that has been explained in accordance with the flow chart in FIG. 17. Referring to the flow chart in FIG. 18, the following description will discuss operations of this function.

The digital copying machine 93 starts communication with other digital copying machines (S61), and gathers from the other copying machines information about operation states thereof (S62). In the digital copying machines, the PCUs 74 manage the states of the respective digital copying machines. Therefore, the above-mentioned information is obtained by accessing the PCUs 74. Thereafter, the digital copying machine 93 sorts out the obtained information (S63), and transmits the sorted state data of the digital copying machines to the digital copying machines (S64).

Figure 19:
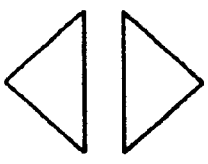
FIG. 19 is an explanatory view that shows a display operation of the operation states of the respective digital copying machines on the liquid crystal display on the basis of the operation shown in FIG. 18.

The digital copying machines are thereby enabled to display, for example, as shown in FIG. 19 on the liquid crystal display 1 in accordance with the above-mentioned state data. In FIG. 19, for example, PPA corresponds to the digital copying machine 92, PPB to the digital copying machine 91, PPC to the digital copying machine 93 and PPD to the printer 95. The above-mentioned management functions facilitates management of the whole image-forming system by a serviceman and the like.

Next, referring to the flow chart in FIG. 20, the following description will discuss an operation of the digital copying machine 93 for selecting another digital copying machine in a case when the digital copying machine 93 is assigned image processing by another digital copying machine in the above arrangement.

As predetermined image processing is set in the digital copying machine that assigns the processing (S71), the digital copying machine that assigns the processing transmits to the digital copying machine 93 a command code representing contents of the image processing and image data to be processed. The digital copying machine 93 stores the data in the memory 73, confirms the assigned image data in accordance with this data, and selects a digital copying machine that is capable of carrying out the image processing (S72).

Then, the digital copying machine 93 selects the most appropriate digital copying machine from the digital copying machines selected in S72 in accordance with the above-mentioned conditions (S73). Thereafter, the digital copying machine 93 transmits to the selected digital copying machine the image data and command code for ordering the image processing. The selected digital copying machine thereby carries out the assigned image processing (S74). The processed image data is returned via the digital copying machine 93 to, for example, the digital copying machine that has assigned the processing. The laser printer section 32 of that digital copying machine outputs the processed image data as an image. Alternatively, the system may be arranged so that the processed image data is outputted by the laser printer section 32 of the digital copying machine that has carried out the image processing.

In the operations in FIG. 20, the system is arranged so that the digital copying machine 93 selects a digital copying machine that carries out the image processing and the selected digital copying machine automatically carries out the image processing. However, alternatively, the system may be arranged to leave to selection by the user the decision whether the processing is to be carried out by the digital copying machine selected by the digital copying machine 93. In this case, the digital copying machine finally selected by the digital copying machine 93 in S73 is displayed on the liquid crystal display 1 of the digital copying machine that has assigned the processing, and a message asking whether the processing is operable in that digital copying machine. Thereafter, in a case when the user inputs "operable", the operation proceeds to S74 and the processing is carried out. On the other hand, if there is no "operable" input in a predetermined time, or if a cancellation input is made, the processing is suspended.

Moreover, the present image-forming system is arranged so that in a case when the digital copying machine 93 that functions as the main digital copying machine is assigned image processing by another digital copying machine and carries out the image processing as shown in FIG. 1, and also in a case when the digital copying machine selected by the digital copying machine 93, that is assigned image processing by another digital copying machine, carries out the image processing as shown in FIG. 20, if the digital copying machine that carries out the image processing is further ordered with an input through the operation panel 90 to carry out the image processing on image data read by the scanner section 31 thereof, one of the three following operations is carried out. Adoption of any of the three arrangements enables highly efficient processing.

The first one is an arrangement carrying out the image processing on the image data assigned by another digital copying machine (hereinafter, will be referred to as the assigned image data), and the image processing on the image data read by the scanner section 31 of the digital copying machine that carries out the image processing (hereinafter, will be refereed to as the read image data) i n a parallel manner. This arrangement is possible when an image-processing section of that digital copying machine can carry out the image processing at high speeds, and the memory 73 has a large capacity.

The second one is an arrangement temporarily suspending the image processing on the assigned image data and carrying out the image processing on the read image data first. In this case, after the image processing is carried out on the assigned image data up to the point where management is done easily, the image processing is suspended, and the image data processed so far and processing situation thereof are stored in the memory 73. Then, after the image processing on the read image data is completed, the image processing on the assigned image data is restarted.

The third one is an arrangement assigning the image processing on the read image data to another digital copying machine capable of carrying out the image processing with the operations shown in FIG. 20, and only carrying out the image processing on the present assigned image data.

The digital copying machines 91 through 93 are in scope of the above explanation; however, a combination of the scanner 94 and the printer 95, also being able to function as a digital copying machine, may be in scope of the explanation in the same manner as the digital copying machine. In this case, the image data obtained by the reading of, for example, scanner 94 is transmitted to the digital copying machine 93 and then subjected to the image processing, and the processed image data is transmitted to the printer 95 to be printed. In addition, it is also possible to carry out the image processing on the image data inputted to the printer 95 with the digital copying machine 93, and then return the processed image data to the printer 95 to be printed. Therefore, only the printer 95 may be in scope of the communication with other digital copying machines. This applies to arrangements shown in the other embodiments of the invention.

[Second Embodiment]

Referring to FIG. 21, the following description will discuss another embodiment of the present invention.

The present image-forming system is provided with, for example, six digital copying machines 201 through 206 as shown in FIG. 21. The digital copying machines 201 through 206 have interfaces 201a through 206a, respectively, for communicating with each other. The digital copying machine 201 having a memory 73 of the largest capacity and the digital copying machine 202 having the most image-processing functions are main digital copying machines that function as main image-forming apparatuses in the present image-forming system.

The digital copying machine 201 that function as a second image-forming apparatus and the digital copying machine 202 that function as a first image-forming apparatus are connected to enable communication with each other via the interfaces 201a and 202a thereof and the communication line 96. The digital copying machines 203 through 206 are connected in the same manner to enable communication with the digital copying machine 201 via the interfaces 201a and 203a through 206a thereof and the communication line 96. Moreover, the digital copying machines 202 to 206 are arranged to be able to communicate with digital copying machines other than the digital copying machine 201 via the digital copying machine 201.

The present image-forming system is arranged so that the digital copying machines 201 and 202 constitute the main digital copying machines, and the main digital copying machines are capable of carrying out the operations explained in the first embodiment of the invention. For example, functions of the digital copying machine 202 correspond to the digital copying machine 93 shown in FIG. 11, and functions of the digital copying machine 201 include less image-forming functions and a larger memory capacity than the digital copying machine 93. Functions of the digital copying machines 203 and 204 correspond to the digital copying machine 92, and functions of the digital copying machines 205 and 206 correspond to the digital copying machine 91.

The digital copying machines 201 and 202 constituting the main digital copying machines share jobs as follows: the digital copying machine 201 is mainly in charge of managing image data that needs the large capacity of the memory 73, and the digital copying machine 202 is in charge of image processing. In other words, for example, in a case when the image processing is assigned by the digital copying machine 203, image data sent from the digital copying machine 203 is stored in the memory 73 of the digital copying machine 201, and then sequentially sent to the digital copying machine 202 to be subjected to the image processing. The processed image data is again stored in the memory 73 of the digital copying machine 201, and then returned from the digital copying machine 201 to the digital copying machine 203. Such control is carried out in, for example, the PCU 74 of the digital copying machine 201.

In comparison with a case when the main digital copying machine that requires advanced functions is constituted by one digital copying machine, arranging the main digital copying machine with such job sharing among a plurality of digital copying machines can cut down the cost, and also improve the efficiency of the image-forming system.

In a case when image processing is carried out on assigned image data, the image data is stored in the memory 73 of the digital copying machine 201, and sequentially sent to the digital copying machine 202 to be subjected to the image processing. Therefore, such a job sharing makes it possible to efficiently carry out the image-processing operations without putting a large burden on the digital copying machine 202 that carries out the image processing.

[Third Embodiment]

Referring to FIG. 22, the following description will discuss yet another embodiment of the invention.

The present image-forming system is provided with, for example, five digital copying machines 211 through 215 as shown in FIG. 22. The digital copying machines 211 through 215 have interfaces 211a through 215a, respectively, for communicating with each other. The digital copying machines 211 through 215 are connected via the interfaces 211a through 215a and a communication line 96 so as to form a loop-like network. The digital copying machines 211 through 215 have an arrangement corresponding to the above-mentioned digital copying machine 30.

The present image-forming system is arranged so that if any of the digital copying machines 211 through 215 does not have a desired image-forming function, the image processing on image data is assigned to one of the other digital copying machines. Therefore, each of the digital copying machines 211 through 215 has information about image-processing functions and memory capacities of the other digital copying machines. The operations for obtaining this information are the same as the operations by the predetermined digital copying machine shown in FIG. 17. The assigning operation of the image processing may be designed so that each of the digital copying machines automatically selects a digital copying machine that is to be assigned the image processing, or so that the respective liquid crystal displays 1 display digital copying machines capable of carrying out the processing so as to be selected by the user.

The present image-forming system is designed to carry out the same operations as the image-forming system of the first embodiment of the invention. In this case, the digital copying machine that is assigned image processing by a digital copying machine that assigns the image processing is not a main digital copying machine, but another digital copying machine having that image-processing function.

This arrangement of the present image-forming system, that does not specify the main digital copying machine, is effective when the digital copying machines 211 through 215 have different image-forming functions from each other.

As mentioned so far, the image-forming system of the present invention is characterized in that it includes:

a main image-forming apparatus;

an auxiliary image-forming apparatus; and a communication apparatus for connecting the main and auxiliary image-forming apparatuses for transmitting and receiving image information with each other, wherein each of the main and auxiliary image-forming apparatuses includes:

an image-recording section for forming a visual image in accordance with the image information; and an input section for inputting an instruction about processing by the image-forming apparatus, the auxiliary image-forming apparatus including a control section capable of outputting the image information to the main image-forming apparatus in accordance with the instruction for predetermined processing on the image information through the inputting section, the main image-forming apparatus including: a processing section for carrying out the predetermined processing on the image information; and a control section for supplying to the processing section the image information inputted via the communication apparatus and for outputting the image information processed here via the communication apparatus to the auxiliary image-forming apparatus.

With this, even if, for example, an image-processing function desired by the user cannot be found with the image-forming apparatus that the user intends to use, the present image-forming system enables the image processing to be carried out by another image-forming apparatus connected to that image-forming apparatus via the communication apparatus. Therefore, the individual image-forming apparatuses constituting the image-forming system are not necessarily provided with the predetermined image-forming function. This decreases economic burden on the user of the image-forming apparatuses.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An image-forming digital copying system, comprising:

a first image-forming digital copying apparatus;

a second image-forming digital copying apparatus; and a communication apparatus for connecting the first and second image-forming digital copying apparatuses for transmitting and receiving image information with each other, wherein each of the first and second image-forming digital copying apparatuses includes, an image-recording section for forming a visual image in accordance with the image information;

an input section for inputting an instruction about processing at the image-forming digital copying apparatus; and an image printing section for printing a processed image, the second image-forming digital copying apparatus including a control section capable of outputting the image information to the first image-forming apparatus in accordance with the instruction for predetermined processing on the image information through the input section, the first image-forming digital copying apparatus including: a processing section for carrying out the predetermined processing on the image information; and a control section for supplying to the processing section the image information inputted via the communication apparatus and for outputting the image information processed here via the communication apparatus to the second image-forming apparatus, wherein the first image-forming digital copying apparatus is connected to a plurality of the second image-forming digital copying apparatuses, wherein at least one of the second image-forming digital copying apparatuses includes: a processing section for carrying out the predetermined processing on the image information; and a control section for supplying to the processing section the image information inputted via the communication apparatus and for outputting the image information processed here via the communication apparatus to one of the other image-forming apparatuses, and the control section of the first image-forming digital copying apparatus obtains management information representing a kind of operable processing in the processing sections of the second image-forming digital copying apparatuses by communicating with control sections of the second image-forming digital copying apparatuses via the communication apparatus and, when judging that the processing on image information assigned by one of the second image-forming digital copying apparatuses is inoperable in the processing section of the first image-forming digital copying apparatus, but operable in the processing section of one of the other second image-forming digital copying apparatuses, assigns the processing by transferring the image information to be processed to that other second image-forming digital copying apparatus that is judged capable of carrying out the processing.

2. The image-forming system as defined in claim 1, wherein the processing section of the first image-forming apparatus is an image-processing section for carrying out the predetermined image processing on the image information.

3. The image-forming system as defined in claim 1, wherein the processing section of the first image-forming apparatus is an image information storing section for storing the image information.

4. The image-forming system as defined in claim 1, wherein the second image-forming apparatus includes a display section, wherein the control section of the first image-forming apparatus is for transmitting management information representing a kind of operable processing in the processing section of the first image-forming apparatus to the second image-forming apparatus via the communication apparatus, and the control section of the second image-forming apparatus is for displaying on the display section the kind of the operable processing in the first image-forming apparatus in accordance with the management information.

5. The image-forming system as defined in claim 1, wherein the control section of the first image-forming apparatus determines time required to carry out the processing assigned by the second image-forming apparatus, and transmits the information about the processing time via the communication apparatus to the second image-forming apparatus that has assigned the processing, and the second image-forming apparatus includes informing means for informing the user of the information about the processing time.

6. The image-forming system as defined in claim 1, wherein the second image-forming apparatus includes an image information storing section for storing the image information that has been already processed by the processing section of the first image-forming apparatus, and the control section of the second image-forming apparatus supplies the image information stored in the image information storing section to the image-recording section in accordance with an instruction through the input section for outputting the image information.

7. The image-forming system as defined in claim 1, wherein the second image-forming apparatus includes informing means for informing the user of progress of the processing on the image information in accordance with information from the processing section of the first image-forming apparatus.

8. The image-forming system as defined in claim 2,
wherein the first image-forming apparatus is connected to a plurality of the second image-forming apparatuses,
wherein at least one of the second image-forming apparatuses includes: a processing section for carrying out the predetermined image processing on the image information; and a control section for supplying to the processing section the image information inputted via the communication apparatus and for outputting the image information processed here via the communication apparatus to one of the other image-forming apparatuses,
the first image-forming apparatus includes an image information reading section for obtaining the image information by reading a document image,
the control section of the first image-forming apparatus obtains management information representing a kind of operable image processing in the processing sections of the second image-forming apparatuses by communicating with the control sections of the second image-forming apparatuses via the communication apparatus, and, if image information on which image processing is needed to be carried out is inputted from an image information reading section while the processing section of the first image-forming section is carrying out the image processing on image information assigned by one of the second image-forming apparatuses, the control section assigns the inputted processing by transferring the image information to one of the other second image-forming apparatuses that can carry out the image processing instructed with respect to the image information.

9. An image-forming digital copying system, comprising:
a plurality of image-forming digital copying apparatuses; and
a communication apparatus for connecting the image-forming digital copying apparatuses for transmitting and receiving image information with each other,
wherein each of the image-forming digital copying apparatuses includes:
an image-recording section for forming a visual image in accordance with the image information;
an input section for inputting an instruction about processing at the image-forming apparatus;
a control section for keeping management information representing a kind of operable processing in the other image-forming digital copying apparatuses, the management information being obtained with a communicating operation via the communication apparatus, for selecting one of the image-forming digital copying apparatuses that can carry out predetermined processing in accordance with an instruction through the input section for the predetermined processing on the image information and the management information, and for outputting the image information via the communication apparatus to the selected image-forming digital copying apparatus; and
an image printing section for printing a processed image,
wherein at least one of the image-forming digital copying apparatuses is a processable image-forming digital copying apparatus including: a processing section for carrying out the predetermined processing on the image information; and a control section for supplying to the processing section the image information inputted via the communication apparatus and for immediately outputting the image information processed here via the communication apparatus to one of the other image-forming digital Copying apparatuses so that a processing of the following image information as read can be carried out successively,
wherein the image forming digital copying apparatus to which the image processing is assigned is selected in accord with at least one of the following:
(a) the management image-forming digital copying apparatus makes, besides the management information, operation state information representing operation states of the other image-forming digital copying apparatuses and supplies the operation state information to the other image-forming digital copying apparatuses, and
each of the control sections of the image-forming digital copying apparatuses selects one of the image-forming digital copying apparatuses that is standing-by as the image-forming distal copying apparatus that is to be assigned the processing in accordance with the operation state information;
(b) the management image-forming digital copying apparatus makes, besides the management information, operation state information representing operation states of the other image-forming digital copying apparatuses and supplies the operation state information to the other image-forming digital copying apparatuses, and
each of the control sections of the image-forming digital copying apparatuses selects one of the image-forming digital copying apparatuses that has the largest empty capacity in the image information storing section for storing the image information as the image-forming apparatus that is to be assigned the processing in accordance with the operation state information;
(c) each of the control sections of the image-forming digital copying apparatuses selects one of the image-forming digital copying apparatuses having an instructed processing function, which is capable of carrying out the processing most quickly, as the image-forming digital copying apparatus that is to be assigned the processing in accordance with the management information; or
(d) each of the control sections of the image-forming digital copying apparatuses selects one of the image-forming digital copying apparatuses having an instructed processing function, which is provided with the latest image-processing function, as the image-forming digital copping apparatus that is to be assigned the processing in accordance with the management information.

10. The image-forming system as defined in claim 9,
wherein the processing section of the processable image-forming apparatus is an image-processing section for carrying out the predetermined processing on the image information.

11. The image-forming system as defined in claim 9, wherein the processing section of the processable image-forming apparatus is an image information storing section for storing the image information.

12. The image-forming system as defined in claim 9, wherein the processing section of the processable image-forming apparatus returns the image information processed by the processing section to the image-forming apparatus that has assigned the processing.

13. The image-forming system as defined in claim 9, wherein each of the image-forming apparatuses has a display section, and the control section of the image-forming apparatus displays a kind of operable processing in the image-forming apparatus on the display section in accordance with the management information.

14. The image-forming system as defined in claim 9, wherein at least one of the image-forming apparatuses is a management image-forming apparatus for making the management information by communicating with the control sections of the other image-forming apparatuses via the communication apparatus, the management image-forming apparatus supplying the management information to the other image-forming apparatuses.

15. The image-forming system as defined in claim 14, wherein the management image-forming apparatus makes, besides the management information, operation state information representing operation states of the other image-forming apparatuses and supplies the operation state information to the other image-forming apparatuses, and each of the image-forming apparatuses has a display section, and the control section of the image-forming apparatus displays the operation states of the image-forming apparatuses on the display section in accordance with the operation state information.

16. The image-forming system as defined in claim 12, wherein the control section of the processable image-forming apparatus determines time required to carry out the processing assigned by one of the other image-forming apparatuses and transmits information about the processing time via the communication apparatus to the image-forming apparatus that has assigned the processing, and each of the image-forming apparatuses is provided with informing means for informing the user of the information about the processing time.

17. The image-forming system as defined in claim 12, wherein each of the image-forming apparatuses that are capable of assigning the processing on the image information to one of the other image-forming apparatuses includes an image information storing section for storing the image information processed by the processing section of the image-forming apparatus that is assigned the processing, the control section of the image-forming apparatus supplying the image information stored by the image information storing section to the image-recording section in accordance with an instruction to output the image information through the input section.

18. The image-forming system as defined in claim 12, wherein each of the image-forming apparatuses has informing means for informing the user of progress of the processing on the image information by the processing section of the processable image-forming apparatus in accordance with from the completion of the processing.

19. The image-forming system as defined in claim 10, comprising at lease two processable image-forming apparatuses, wherein each of the processable image-forming apparatuses has an image information reading section for obtaining the image information by reading the image of document, and the control section of the processable image-forming apparatus obtains management information representing a kind of operable image processing in the processing sections of the image-forming apparatuses by communicating with the control sections of the processable image-forming apparatuses via the communication apparatus, and, if image information on which image processing is needed to be carried out is inputted from the image information reading section while the processable image-forming apparatus is carrying out image processing on image information that has been assigned by one of the other image-forming apparatuses, assigns the processing to one of the other processable image-forming apparatuses that is capable of carrying out the image processing instructed with respect to the inputted image information by transmitting the inputted image information to the processable image-forming apparatus.

20. An image-forming digital copying system, comprising:

a main image-forming digital copying apparatus;

an auxiliary image-forming digital copying apparatus; and a communication apparatus for connecting the main and auxiliary image-forming digital copying apparatuses for transmitting and receiving image information with each other, wherein each of the main and auxiliary image-forming digital copying apparatuses includes:

an image-recording section for forming a visual image in accordance with the image information;

an input section for inputting an instruction about the processing at the image-forming digital copying apparatus; and an image printing section for printing a processed image, the auxiliary image-forming digital copying apparatus including a control section capable of outputting the image information to the main image-forming digital copying apparatus in accordance with the instruction for the predetermined processing on the image information through the inputting section, the main image-forming digital copying apparatus including: a processing section for carrying out the predetermined processing on the image information; and a control section for supplying to the processing section the image information received by the input section via the communication apparatus and for sending the image information processed here back via the communication apparatus to the auxiliary image-forming digital copying apparatus, wherein the main image-forming digital copying apparatus includes a first main image-forming digital copying apparatus and a second main image-forming digital copying apparatus connected by the communication apparatus, the first main image-forming digital copying apparatus having an image-processing section for carrying out the predetermined image processing on the image information as the processing section of the main imaging-forming digital copying apparatus, and the second main image-forming digital copying apparatus having an image information storing section for storing the image information of the main imaging-forming digital copying apparatus, the image information being stored therein for processing by the first main image-forming digital copying apparatus as the processing section.

21. The image-forming system as defined in claim 20, wherein the image-processing section of the first main image-forming apparatus is provided with the most image-processing functions of the image-processing sections of the image-forming apparatuses in the image-forming system.

22. The image-forming system as defined in claim 20, wherein the image information storing section of the second main image-forming apparatus is provided with the largest storage capacity of the image information storing sections of the image-forming apparatuses in the image-forming system.

23. The image-forming system as defined in claim 20, wherein the image information storing section of the second main image-forming apparatus stores the image information transmitted from the auxiliary image-forming apparatus in assigning the image processing, and the image-processing section of the first main image-forming apparatus sequentially carries out the image processing on the image information stored in the image information storing section of the second main image-forming apparatus.

24. The image-forming system as defined in claim 20, wherein the control section of the image-forming apparatus transmits management information representing a kind of operable image processing in the main image-forming apparatus via the communication apparatus to the auxiliary image-forming apparatus, the auxiliary image-forming apparatus having a display section, the control section of the auxiliary image-forming apparatus displaying the kind of the operable processing in the main image-forming apparatus on the display section in accordance with the management information.

25. The image-forming system as defined in claim 20, wherein the control section of the main image-forming apparatus determines time required to carry out the processing assigned by the auxiliary image-forming apparatus and transmits information about the processing time via the communication apparatus to the auxiliary image-forming apparatus that has assigned the processing, and the auxiliary image-forming apparatus includes informing means for informing the user of the information about the processing time.

26. The image-forming system as defined in claim 20, wherein the auxiliary image-forming apparatus includes an image information storing section for storing the image information processed by the processing section of the main image-forming apparatus, the control section of the auxiliary image-forming apparatus supplying the image information stored by the image information storing section to the image-recording section in accordance with an instruction to output the image information through the input section.

27. The image-forming system as defined in claim 20, wherein each of the image-forming apparatuses has informing means for informing the user of progress of the processing on the image information by the processing section of the processable image-forming apparatus in accordance with from the completion of the processing.

28. The image-forming system as defined in claim 7, wherein the informing means includes a display section for displaying the progress of the processing on the image information, and the display section displays the progress in percentage completion.

29. The image-forming system as defined in claim 7, wherein the informing means includes a display section for displaying the progress of the processing on the image information, and the display section displays the progress in terms of remaining time.

* * * * *